(12) United States Patent
Kuriya et al.

(10) Patent No.: US 7,836,311 B2
(45) Date of Patent: Nov. 16, 2010

(54) INFORMATION PROCESSING APPARATUS, INFORMATION PROCESSING METHOD, AND COMPUTER PROGRAM USED THEREWITH

(75) Inventors: Shinobu Kuriya, Kanagawa (JP); Yoshimichi Kitaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1558 days.

(21) Appl. No.: 10/624,019

(22) Filed: Jul. 21, 2003

(65) Prior Publication Data
US 2004/0025058 A1 Feb. 5, 2004

(30) Foreign Application Priority Data
Jul. 23, 2002 (JP) .......................... P2002-213701

(51) Int. Cl.
*G06F 21/00* (2006.01)
(52) U.S. Cl. .................. 713/185; 713/165; 713/167; 713/193; 705/59; 705/57; 705/51
(58) Field of Classification Search ............... 713/150; 380/277
See application file for complete search history.

(56) References Cited

U.S. PATENT DOCUMENTS

| | | | | |
|---|---|---|---|---|
| 5,758,069 A | * | 5/1998 | Olsen | 726/27 |
| 5,905,860 A | * | 5/1999 | Olsen et al. | 726/27 |
| 5,917,912 A | * | 6/1999 | Ginter et al. | 713/187 |
| 6,965,996 B2 | * | 11/2005 | Hirano et al. | 713/176 |
| 7,103,663 B2 | * | 9/2006 | Inoue et al. | 709/225 |
| 2003/0005135 A1 | * | 1/2003 | Inoue et al. | 709/229 |
| 2006/0008256 A1 | * | 1/2006 | Khedouri et al. | 386/124 |
| 2006/0089912 A1 | * | 4/2006 | Spagna et al. | 705/51 |
| 2006/0224903 A1 | * | 10/2006 | Ginter et al. | 713/193 |
| 2006/0253400 A1 | * | 11/2006 | Okamoto et al. | 705/57 |
| 2007/0005989 A1 | * | 1/2007 | Conrado et al. | 713/189 |

FOREIGN PATENT DOCUMENTS

| | | |
|---|---|---|
| JP | 11-213553 | 8/1999 |
| JP | HEI 11-213553 | 8/1999 |
| JP | 2001-195509 | 7/2001 |
| JP | 2001-265361 | 9/2001 |
| JP | 2002-141895 | 5/2002 |

OTHER PUBLICATIONS

Nakae et al., "A Capsulated Content Providing Services Adaptable for Users," (1999).
Notification of Reason for Refusal issued from the Japanese Patent Office in a Counterpart Application Dated Sep. 2, 2008.

* cited by examiner

*Primary Examiner*—Pramila Parthasarathy
(74) *Attorney, Agent, or Firm*—Finnegan, Henderson, Farabow, Garrett & Dunner, L.L.P.

(57) ABSTRACT

Service data or usage right information, used as purchased content or license information, is set so as to be re-acquired on condition that an acquirer is an authorized content-purchasing client. A leaf ID as a client identifier in an enabling-key-block distribution tree, and a restoring-processing requesting file including verification data for the leaf ID are used as client identifying data, whereby it is ensured that an authorized content-purchasing client is verified.

21 Claims, 34 Drawing Sheets

FIG. 4A

SEND VERSION-t NODE KEY
TO DEVICES 0, 1, AND 2

| VERSION: t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG. 4B

SEND VERSION-t NODE KEY
TO DEVICES 0, 1, AND 2

| VERSION: t | |
|---|---|
| INDEX | ENCRYPTION KEY |
| 000 | Enc(K000, K(t)00) |
| 001 | Enc(K(t)001, K(t)00) |
| 0010 | Enc(K0010, K(t)001) |

INFORMATION PROCESSING APPARATUS, INFORMATION PROCESSING METHOD, AND COMPUTER PROGRAM USED THEREWITH

BACKGROUND OF THE INVENTION

1. Field of the Invention

The present invention relates to information processing apparatuses, information processing methods, and computer programs used therewith. In particular, the present invention relates an information processing apparatus, an information processing method, and a computer program which can execute secure creating and restoring processing for a valid client of backup data of client-acquired content.

2. Description of the Related Art

Nowadays, it has become popular that various types of digital data (hereinafter referred to as "content"), such as music data, game programs, and picture data, are distributed by networks such as the Internet, or by using distributable storage media such as memory cards, hard disks, digital versatile disks (DVDs), and compact disks (CDs). The distributed content is stored in a storage unit of a user's own personal computer (PC), a recording/playback unit, a playback-only unit, or a game machine. Examples of storage units include hard disks, card-type storage devices having a flash memory, CDs, and DVDs. Playback processing on the stored content is then executed.

Information technology apparatuses, such as recording/playback apparatuses, game machines, and PCs, include interfaces for receiving content from a network, or interfaces for accessing memory cards, hard disks, DVDs, and CDs. The information apparatuses each include a controller necessary for playing back content, a program, and a random access memory (RAM) and a read-only memory (ROM) for use as memory areas for data.

In response to a user's instruction from an information technology apparatus used as a player, such as a recording/playback unit, a game machine, or a PC, or in response to a user's instruction from a connected input unit, various types of content, such as music data, picture data, and a program, are retrieved from, for example, a built-in or removable storage medium and are played back by the information technology apparatus, or by a display, a speaker, or the like connected to the information technology apparatus.

In general, creators and sellers of many types of digital content, such as game programs, music data, and picture data, possess distribution rights, etc. Accordingly, it is common in distribution of the content to employ certain usage restrictions, that is, secured configuration in which only an authorized user is allowed to use the software, and unauthorized copying, etc., is prevented.

In addition, a configuration has been proposed in which content and a usage right to use the content are separately managed when provided to a user. In this configuration, the user uses the content, for example, by acquiring encrypted content and purchasing usage-right data, and acquires a key (content key) for decrypting the encrypted content based on key data or the like which can be acquired from the usage-right data.

The usage-right data includes setting information of a mode in which the user is allowed to use the content, and a system has been proposed in which the content may have a range of uses as specified by the setting information.

In the above system in which the content and the content-usage right are separately managed when provided to the user, checking of the usage-right data is executed when the content is used, for example, when music data and picture data are played back, distributed, or downloaded.

In such a content providing system, when a problem occurs in an information processing apparatus used as a client content-playback system, such as a PC or a portable terminal, by which it is impossible for the apparatus to access, for example, the content-usage right, it may be impossible to play back the acquired content. In this case, in the present system, the client must acquire a new usage right corresponding to the content by performing a content purchasing process again.

Types of content purchased by the client include content in which implementation of a purchasing process once gives a permanent right to play back the content and to use the content. When the problem of the client apparatus not being able to play back the content occurs, the client which has purchased the content is compelled to purchase the content again, which is a problem.

SUMMARY OF THE INVENTION

The present invention is made in view of the above circumstances and is intended to enable secure execution of creating processing and restoring processing of backup data for content and content-usage-right information so that the use and playback of the content is executable even if a problem, such as loss of the content-usage right or inability to access it, concerning properly acquired content occurs after a client performs authorized content-purchasing processing. It is an object of the present invention to provide an information processing apparatus, an information processing method, and a computer program in which, under predetermined level restrictions, backup data can be created and restored subject to identifying an authorized content purchaser.

According to an aspect of the present invention, an information processing apparatus for controlling, based on a usage right issued from a license server, the decryption and use of encrypted content for the usage right is provided. The information processing apparatus includes a transmitting unit for transmitting, to the license server, a restoring request including client identifying information for identifying one of the information processing apparatus and the user thereof, and verification data for the client identifying information, a receiving unit for receiving a response to the restoring request from the license server, the response including usage-right identifying information corresponding to at least one usage right already issued to the information processing apparatus or the user thereof, a transmitting unit for transmitting, to the license server, a usage-right request including the usage-right identifying information, and a receiving unit for receiving, from the license server, in response to the usage-right request, the usage right corresponding to the usage-right identifying information.

According to another aspect of the present invention, a license server for issuing, to clients, usage rights to permit the use of content is provided. The license server includes a storage unit for storing usage-right identifying information on the issued usage rights in units of the clients, a receiving unit for receiving a restoring request including client identifying information for identifying each of the clients and verification data for the client identifying information, an acquisition/transmission unit for, when verification of the verification data confirms that the restoring request is valid, performing acquisition based on the client identifying information of usage-right identifying information on usage rights already issued to the clients, and transmitting the acquired usage-right identifying information as a response to the restoring request, a receiving unit for receiving a usage-right request including the usage-right identifying information, and a transmitting unit for transmitting, in response to the usage-right request, a usage right corresponding to the usage-right identifying information.

According to another aspect of the present invention, an information processing method for controlling, based on a usage right issued from a license server, the decryption and use of encrypted content for the usage right is provided. The information processing method includes the steps of transmitting, to the license server, a restoring request including client identifying information for identifying one of an information processing apparatus and the user thereof, and verification data for the client identifying information, receiving a response to the restoring request from the license server, the response including usage-right identifying information corresponding to at least one usage right already issued to the information processing apparatus or the user thereof, transmitting, to the license server, a usage-right request including the usage-right identifying information, and receiving, from the license server, in response to the usage-right request, the usage right corresponding to the usage-right identifying information.

According to another aspect of the present invention, a method for controlling a license server for issuing, to clients, usage rights to permit the use of content is provided. The method includes the steps of storing usage-right identifying information on the issued usage rights in units of the clients, receiving a restoring request including client identifying information for identifying each of the clients and verification data for the client identifying information, performing, when verification of the verification data confirms that the restoring request is valid, acquisition based on the client identifying information of usage-right identifying information on usage rights already issued to the clients, and transmission of the acquired usage-right identifying information as a response to the restoring request, receiving a usage-right request including the usage-right identifying information, and transmitting, in response to the usage-right request, a usage right corresponding to the usage-right identifying information.

According to another aspect of the present invention, a program for causing a computer to control, based on a usage right issued from a license server, the decryption and use of encrypted content for the usage right is provided. The program includes the steps of transmitting, to the license server, a restoring request including client identifying information for identifying one of an information processing apparatus and the user thereof, and verification data for the client identifying information, receiving a response to the restoring request from the license server, the response including usage-right identifying information corresponding to at least one usage right already issued to the information processing apparatus or the user thereof, transmitting, to the license server, a usage-right request including the usage-right identifying information, and receiving, from the license server, in response to the usage-right request, the usage right corresponding to the usage-right identifying information.

According to another aspect of the present invention, a program for controlling a license server for issuing, to clients, usage rights to permit the use of content is provided. The program includes the steps of storing usage-right identifying information on the issued usage rights in units of the clients, receiving a restoring request including client identifying information for identifying each of the clients and verification data for the client identifying information, performing, when verification of the verification data confirms that the restoring request is valid, acquisition based on the client identifying information of usage-right identifying information on usage rights already issued to the clients, and transmission of the acquired usage-right identifying information as a response to the restoring request, receiving a usage-right request including the usage-right identifying information, and transmitting, in response to the usage-right request, a usage right corresponding to the usage-right identifying information.

As described above, according to the present invention, a client can re-acquire service data or usage right information as purchased content or license information on condition that the client is identified as one authorized to purchase content. When it is impossible to read purchased or acquired data, content can be used based on backup data.

According to the present invention, in a client, when performing re-acquiring processing on service data or usage right information as purchased content or license information, a data file including a leaf ID as a client identifier in an enabling-key-block tree and verification data for the leaf ID is created as a restoring-processing requesting file, and the restoring-processing requesting file is used as client identifying data. Thus, it is ensured that verification of an authorized content-purchasing client is performed.

BRIEF DESCRIPTION OF THE DRAWINGS

FIGS. 4A and 4B are illustrations of examples of an enabling key block for use in distribution of various keys and data;

DESCRIPTION OF THE PREFERRED EMBODIMENTS

Figure 1:
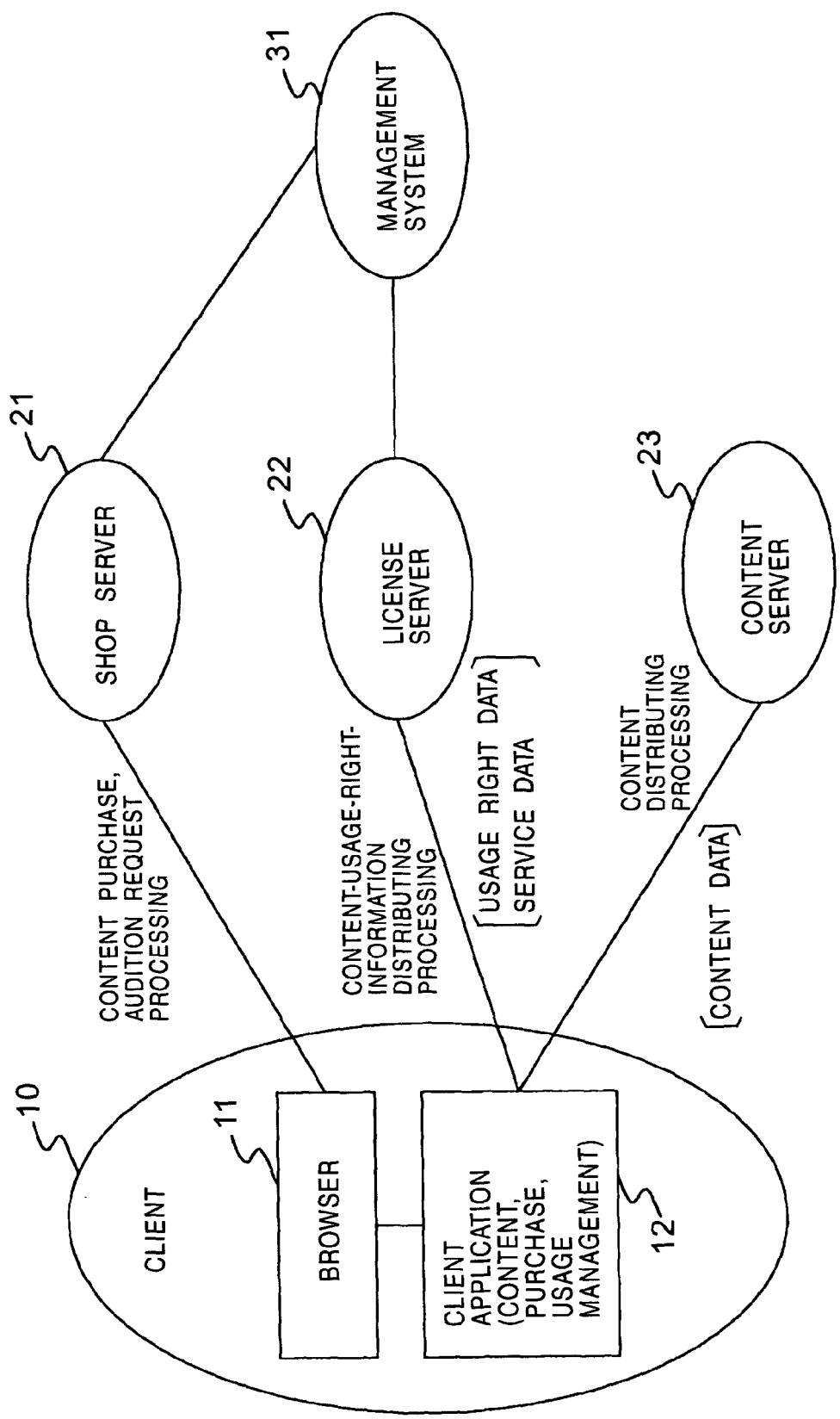
FIG. 1 is a schematic block diagram showing a content providing system to which the present invention is applied.

The structure of the present invention is described below. The description consists of the following items:
1. Outline of Content Providing System
2. Tree Structure as Key Distribution Configuration
3. Key Distribution Using Enabling Key Block
4. Enabling Key Block Format
5. Category Classification of Trees
6. Content Purchasing Processing and Audition Processing
7. Backup/Restoring Processing
8. Secondary Distribution of Content by Using Recommendation File 1. Outline of Content Providing System FIG. 1 is a block diagram illustrating an outline of a content providing system to which the present invention is applied. A client 10 that uses content is an information processing apparatus, that is, an apparatus that can play back the content. The client 10 includes, for example, various information processing apparatuses such as a PC and a personal digital assistant (PDA). The client 10 has a browser 11 and a client application 12 as software. The browser 11, the client application 12, and other programs are executed by a controller such as a central processing unit (CPU).

The client application 12 executes purchasing processing and audition processing on the content in the client 10, acquiring processing on license information including service data and content-usage-right information (described later), backup/restoring processing on the content and the license information, confirmation processing on the content-usage right, content-playback managing processing, processing for creating a recommendation file as a secondary distribution content file, etc. The client application 12 is stored as a processing program (described later) in the client 10 as an information processing apparatus. In this specification, "audition" includes not only the meaning of listening to a sample of music data, but also previewing picture data.

The client 10 is connected to a shop server 21, a license server 22, and a content server 23 by, for example, a communication network such as the Internet. The content server 23 provides the client 10 with content. The license server 22 provides the client 10 with usage right information of the content for use in the client 10. The shop server 21 functions as an interface when the client 10 purchases the content. The shop server 21 uses a browser to display content that can be purchased or auditioned when it receives a purchase or audition request from the client 10. The shop server 21 performs accounting processing concerning the purchased content, as required.

The shop server 21 and the license server 22 are also connected to a management system 31. The management system 31 performs processing for issuing a transaction ID (TID) that functions as permission information for a content request from the client 10, and processing for issuing content-downloading permission information. The management system 31 also permits the license server 22 to issue usage-right data (indicated by "USAGE RIGHT") as usage information of the content. The details of these processes are described later.

Under the control of the client application 12, the client 10 executes acquisition of a usage right from the license server 22, and acquisition of content from the content server 23. The client 10 executes viewing and settlement processes on information provided by the shop server 21 by starting the browser 11 under the control of the client application 12.

Although FIG. 1 shows only one client 10 and only one server of each type, the number of clients 10 and the number of servers of each type may be more than one. In such a case, for example, the clients 10 and the servers are connected to a communication network such as the Internet. Each client 10 connects to shop servers 21 of various types, freely selects content provided by each shop server 21, acquires the selected content from a content server 23 storing the content, selects a license server 22 for issuing a usage right for the acquired content, and acquires the usage right from the selected license server 22.

The content is provided as encrypted content from the content server 23 to the client 10. Content-usage-right information corresponding to the content is provided from the license server 22 to the client 10. The client application 12 of the client 10 verifies the usage right information, and decrypts the encrypted content and uses the decrypted content when determining that the usage right is valid.

The client 10 retains, as key information for enabling content usage based on content usage right, key data such as an enabling key block (EKB) and a device node key (DNK). Each of the enabling key block and the device node key is key data for acquiring an encryption key which is necessary for content use for enabling only a user device having a valid content usage right to decrypt encrypted content so that the content is usable. The enabling key block and the device node key are described later.

The content server 23 encrypts the content and provides the encrypted content to the client 10. The license server 22 creates usage right information based on content-usage conditions and provides the usage right information to the client 10. The license server 22 creates service data based on the device node key and enabling key block provided by the management system 31, and provides the service data to the client 10. The service data includes an enabling key block having a service device node key (SDNK) which is necessary for decryption processing of the encrypted content.

The content-usage conditions include a condition concerning limitation of the period of use, a limit on the number of times copying may be performed, and the number (corresponding to the number of times so-called "check-out" is performed) of pieces of portable media in which the content may be simultaneously used. The portable media are storage media usable in portable devices, such as flash memory, small hard disks, optical disks, magneto-optical disks, or MiniDisks (MDs).

Figure 2:
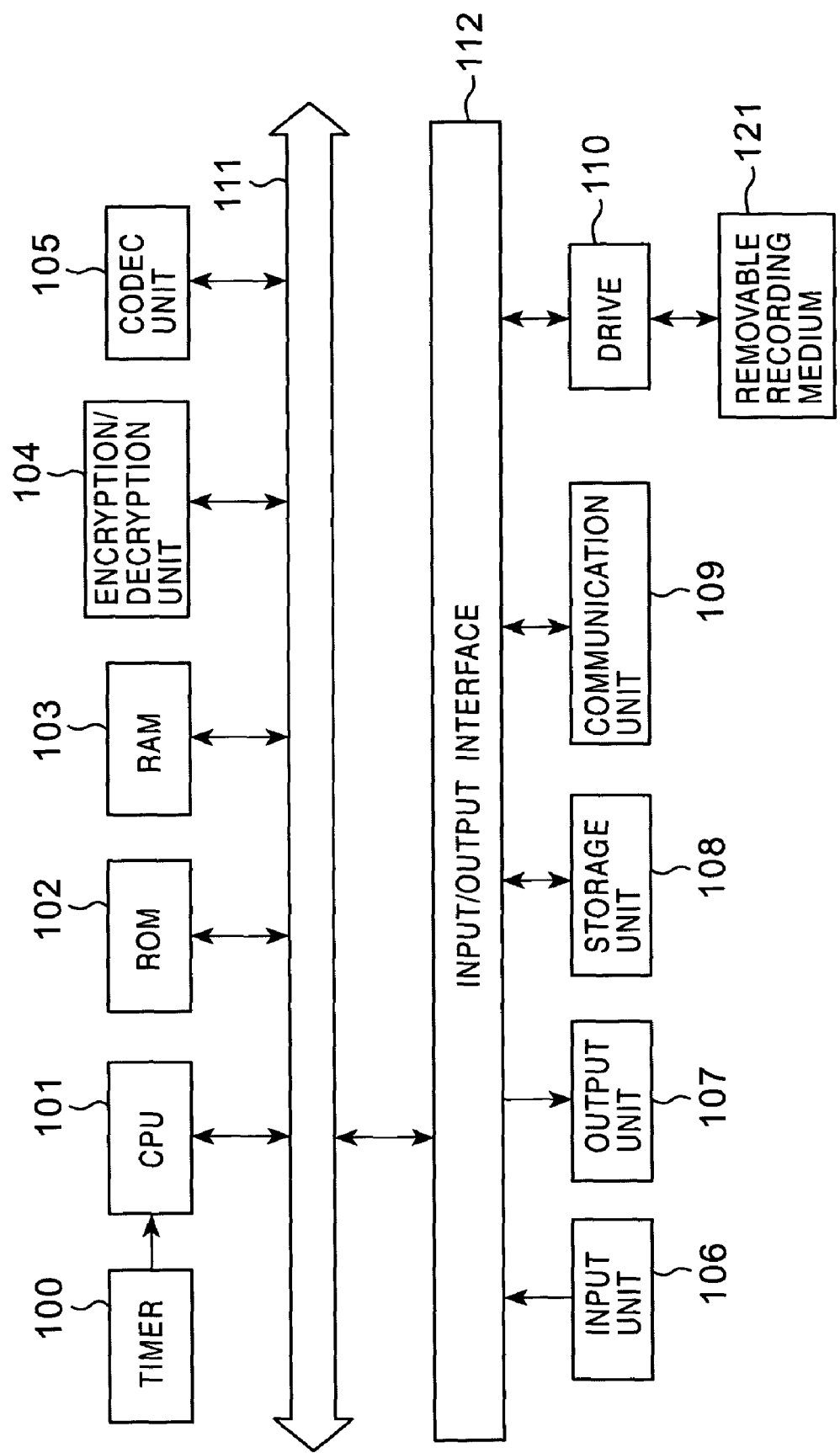
FIG. 2 is a block diagram showing the structure of each of a client, servers, and a management system.

Next, an example an information processing apparatus that can function as the client 10, the shop server 21, the license server 22, the content server 23, or the management system 31 is described with reference to FIG. 2. Each system is realized by installing, in a system such as a personal computer or a server including a CPU, a processing program adapted for each type of processing.

At first, by using FIG. 2, the example of each system is described below.

A CPU 101 executes various processes in accordance with various programs stored in a read-only memory (ROM) 102, or programs which are loaded into a random access memory (RAM) 103 after being stored in a storage unit 108. A timer 100 performs clocking, and supplies clock information to the CPU 101.

The ROM 102 stores programs which are used by the CPU 101, parameters for arithmetic operations, fixed data, etc. The RAM 103 stores a program to be executed by the CPU 101, and data such as parameters which change in accordance with the execution of the program. These units are connected to one another by a bus 111 including a CPU bus.

An encryption/decryption unit 104 executes, for example, encryption processing to which an encrypting algorithm of the Data Encryption Standard (DES) is applied, creation of message authentication code (MAC), verifying processing, etc., as processing to which content encryption processing, decryption processing, a device node key, and an enabling key block are applied. Also, the encryption/decryption unit 104 executes various encrypting processes such as authentication processing executed between the encryption/decryption unit 104 and another connected device when content or license information is transmitted/received, and session key sharing processing.

A codec unit 105 executes data encoding and decoding processes based on various methods such as ATRAC3 (Advance Transform Acoustic Coding 3), MPEG (Moving Picture Experts Group), and JPEG (Joint Photographic Experts Group) methods. Data to be processed is input from a removable storage medium 121 or a communication unit 109 through the bus 111, an input/output interface 112, and a drive 110. Processed data is stored in the removable storage medium 121 or is output from the communication unit 109, if needed.

The input/output interface 112 is connected to an input unit 106 including a keyboard and a mouse, an output unit 107 including a display unit such as a cathode-ray tube or a liquid crystal display, and a speaker, the storage unit 108, which is a hard disk drive or the like, and the communication unit 109, which includes a modem and a terminal adapter. The input/output interface 112 transmits and receives data by using, for example, a communication network such as the Internet.

2. Tree Structure as Key Distribution Configuration

Next, one form of broadcast encryption for enabling only a client having a valid content usage right to use content, that is, a tree-structure device-and-key management configuration is described below.

Figure 3:
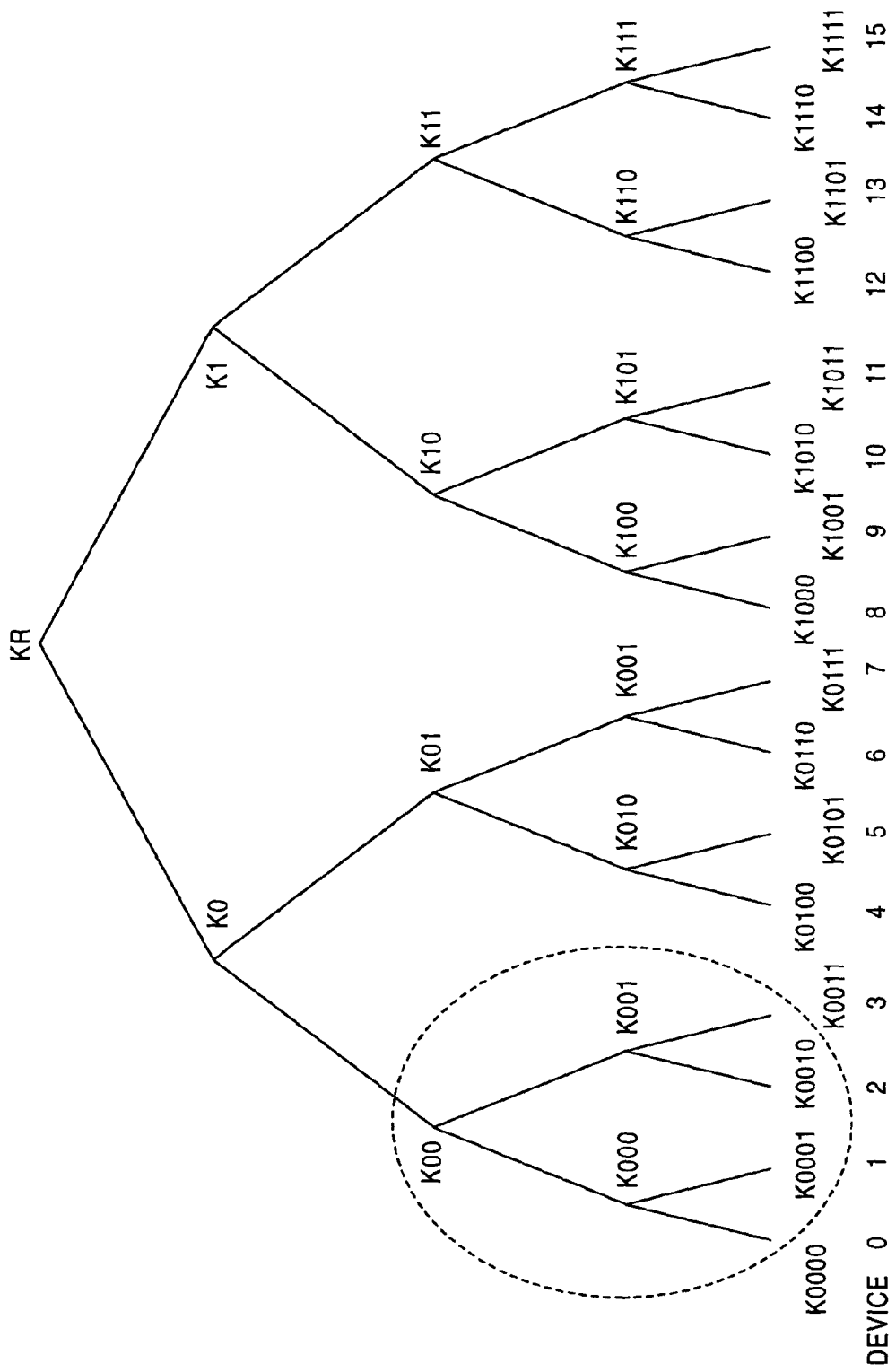
FIG. 3 is a tree configuration diagram illustrating encryption and distribution of various keys and data.

The numbers 0 to 15 shown at the bottom of FIG. 3 indicate user devices as clients that use content. In other words, leaves in the hierarchical tree structure shown in FIG. 3 correspond to the devices.

When being produced or shipped, each of the devices 0 to 15 stores, in its memory, key sets (DNKs) consisting of keys (node keys) assigned to nodes from its leaf to a root in the hierarchical structure, and leaf keys corresponding to the leaves. The numbers K0000 to K1111 shown at the bottom of FIG. 3 indicate leaf keys assigned to the devices 0 to 15. The root key at the top to the second keys from the bottom, indicated by KR to K111, are node keys.

In the tree structure in FIG. 3, for example, device 0 possesses leaf key K0000 and node keys K000, K00, K0, and KR. Device 5 possesses Leak key K0101 and node keys K010, K01, K0, and KR. Device 15 possesses leaf key K1111 and node keys K111, K11, K1, and KR. Although the tree in FIG. 3 shows only 16 devices from devices 0 to 15 and has a symmetric four-level arrangement, it may have more devices and different numbers of levels in portions of the tree.

The devices included in the tree in FIG. 3 include various types of devices that use various recording media such as DVDs, CDs, MDs, and flash memories of a built-in type or a removable type. Moreover, various application services can coexist. The hierarchical tree structure (in FIG. 3) that is a content- or key-distribution configuration is applied to a system in which different devices and different applications coexist.

In the system in which the different devices coexist, the portion encircled by the broken line, that is, devices 0, 1, 2, and 3 are set as a group using a single recording medium. For example, processing is executed in which common content is encrypted and is sent from a provider to all the devices included in the group encircled by the broken line. Also, processing is performed in which a content key for use in common by the devices is sent, or payment data of a charge for content is also encrypted and output from each device to a provider or settlement authority. An authority that transmits/receives data to/from devices such as content servers, license servers, and shop servers executes processing for simultaneously transmitting data to the portion encircled by the broken line in FIG. 3, that is, devices 0, 1, 2, and 3 which form a group. Similar groups exist in the tree in FIG. 3. The authority that transmits/receives data to/from devices such as content servers, license servers, and shop servers functions as a message data distributor.

The node key and the leaf keys may be collectively managed by a management system having a function of a key management center, or may be managed in units of groups by a message data distributor that transmits/receives various types of data to/from the groups, such as a provider and a settlement authority. For example, when a leak of key or the like occurs, updating processing on the node key and the leaf keys is executed. The updating processing is executed by a management system, a provider, or a settlement authority which has a key management center function.

In the tree structure, as shown in FIG. 3, four devices 0, 1, 2, and 3, included in one group, possess device node keys including common Keys K00, K0, and KR. By using this node key sharing setup, for example, a common key can be provided only to devices 0, 1, 2, and 3. For example, node key K00 possessed in common is used as a possessed key common to devices 0, 1, 2, and 3. Also, by distributing, to devices 0, 1, 2, and 3, code Enc(K00, Knew) obtained by using node key K00 to encrypt new Key "Knew", on a network or in a form stored in a recording medium, only devices 0, 1, 2, and 3 each can obtain new Key "Knew" by using common node key K00 possessed therein to decrypt code Enc(K00, Knew). The representation "Enc(Ka, Kb)" represents data obtained by using Ka to encrypt Kb.

When it is found at certain time t that Keys K0011, K00, K00, K0, and KR, possessed by device 3, are analyzed and revealed by a hacker, device 3 must be separated from the system (the group of devices 0, 1, 2, and 3) in order that data transmitted and received in the system may be protected thereafter. For that purpose, node keys K001, K00, K0, and KR must be updated to generate new Keys K(t)001, K(t)00, K(t)0, and K(t)R, respectively, and the updated keys must be posted to devices 0, 1, and 2. The representation "K(t)aaa" represents an updated key in the generation of Key Kaaa.

Processing for distributing updated keys is described below.

Key updating is executed such that a table composed of block data called an "enabling key block (EKB)" as shown in FIG. 4A is supplied to devices 0, 1, and 2 by using a network or in a form stored in a recording medium. The enabling key block consists of encryption keys for distributing new updated keys to devices corresponding to the leaves constituting the tree structure as shown in FIG. 3. The enabling key block may also be called the "key renewal block (KRB)".

The enabling key block shown in FIG. 4A is formed by block data having a data configuration that can be updated only by devices having node keys which must be updated. The example in FIG. 4 shows block data formed for the purpose of distributing updated node keys in generation t to devices 0, 1, and 2 in the tree structure in FIG. 3. As is clear from FIG. 3, devices 0 and 1 require K(t)00, K(t)0, and K(t)R as updated node keys, and device 2 requires K(t)001, K(t)00, K(t)0, and K(t)R.

As the enabling key block in FIG. 4A shows, the enabling key block includes a plurality of encryption keys. An encrypted key at the bottom level is Enc(K0010, K(t)001). This is obtained by using leaf key K0010 of device 2 to encrypt updated node key K(t)001. Device 2 can obtain K(t) 001 by using its own leaf key to decrypt the encrypted key. Also, by using K(t)001 obtained by decryption, encrypted Key Enc(K(t)001, K(t)00) at the second level from the bottom in FIG. 4A can be decrypted, whereby updated node key K(t)00 can be obtained. Subsequently, by decrypting encrypted key Enc(K(t)00, K(t)0) at the second level from the top in FIG. 4A, updated node key K(t)0 can be obtained. By decrypting encrypted Key Enc(K(t)0, K(t)R) at the first level from the top in FIG. 4A, updated node key K(t)R can be obtained. In addition, in devices K0000 and K0001, keys to be updated do not include node key K000. Both require K(t)00, K(t)0, and K(t)R as updated node keys. Devices K0000 and K0001 obtain K(t)00 by decrypting encrypted Key Enc (K000, K(t)00) at the third level from the top in FIG. 4A. Subsequently, both obtain updated node key K(t)0 by decrypting encrypted Key Enc(K(t)00, K(t)0), and obtain updated node key K(t)R by decrypting encrypted Key Enc(K (t)0, K(t)R) at the first level from the top in FIG. 4A. As described above, devices 0, 1, and 2 can obtain updated Key K(t)R. The INDEX in FIG. 4A indicates the absolute addresses of node keys and leaf keys for use as decryption keys.

When node keys K(t)b 0 and K(t)R at the top level in the tree structure in FIG. 3 do not need to be updated, and only node key K00 needs to be updated, by using the enabling key block shown in FIG. 4B, updated node key K(t)00 can be distributed to devices 0, 1, and 2.

The enabling key block in FIG. 4B can be used, for example, in the case of distributing a new content key shared by a particular group. Specifically, it is assumed that devices 0, 1, 2, and 3 in the group indicated by the broken line uses a certain recording medium, and it is assumed that a new content key K(t)con is required. At this time, data Enc(K(t), K(t)con), obtained by encrypting new common updated content key K(t)con by using K(t)00 obtained by updating common node key K00 which is common to devices 0, 1, 2, and 3, is distributed together with the enabling key block in FIG. 4B. This distribution enables the distribution of Enc(K(t), K(t) con) as data that cannot be decrypted in a device in another group, such as device 4.

In other words, by using decrypting the above code by using K(t)00 obtained by processing the enabling key block, devices 0, 1, and 2 can obtain a key at time t, for example, content key K(t)con that is applied to encryption/decryption of content.

3. Key Distribution Using Enabling Key Block

Figure 5:
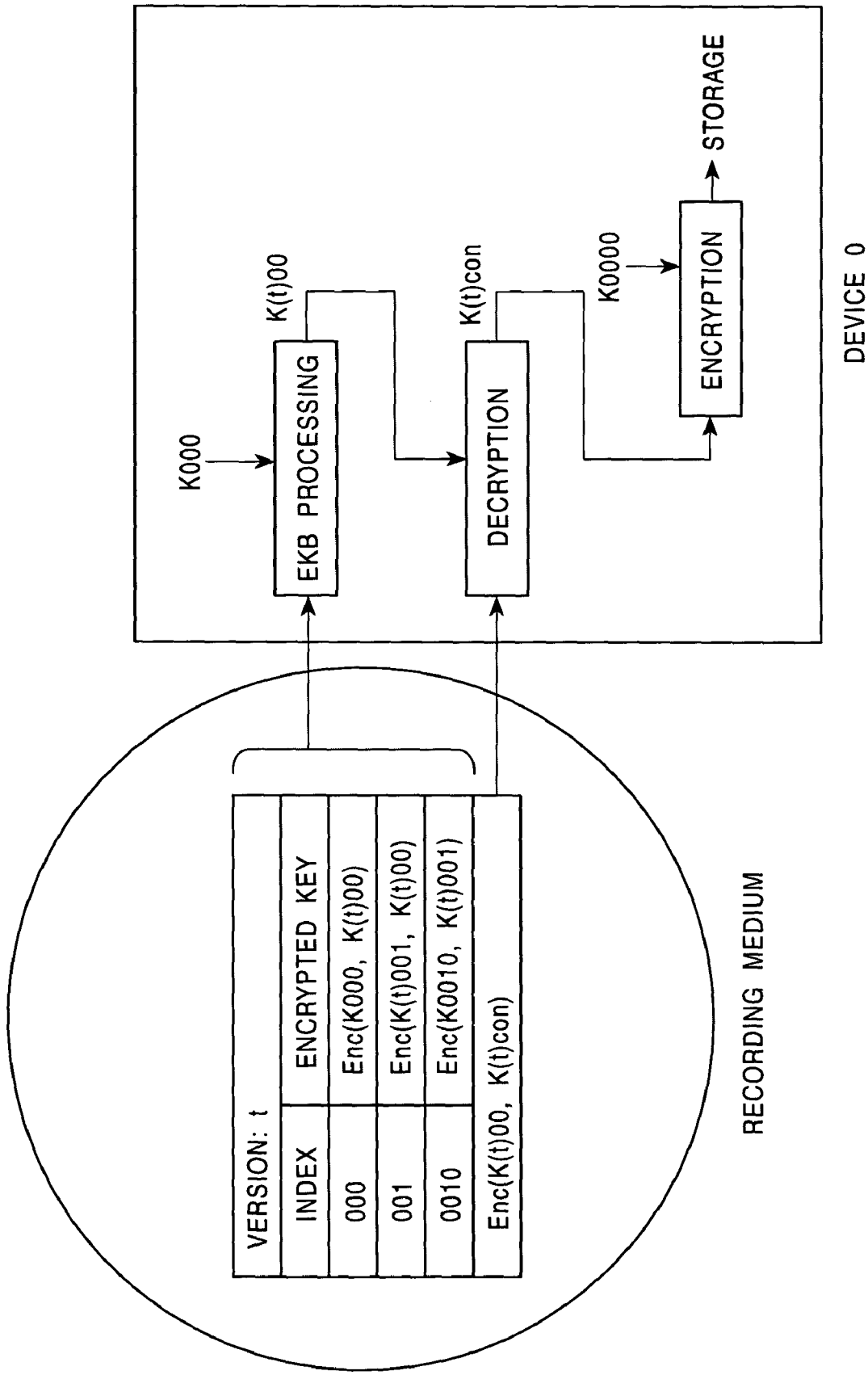
FIG. 5 is an illustration of an example of distribution of an enabling key block for a content key and an example of decryption processing.

FIG. 5 shows, as an example of processing that obtains content key K(t)con which is applied to, for example, content encryption/decryption, a case in which device 0 uses a recording medium to receive data Enc(K(t)00, K(t)con) obtained by using K(t)00 to encrypt new common content key K(t)con, and the enabling key block in FIG. 4B. Specifically, FIG. 5 shows a case in which message data encrypted by the enabling key block is content key K(t)con.

As FIG. 5 shows, device 0 creates node key K(t)00 by performing enabling-key-block processing similar to that described above by using the enabling key block at time t (the generation stored in the recording medium) and node key K000 stored beforehand in device 0. Also, device 0 uses decrypted, updated node key K(t)00 to decrypt updated content key K(t)con, and encrypts the decrypted updated content key K(t)con for later use by using the leaf key K0000 that device 0 only possesses. Device 0 then stores the encrypted key.

4. Enabling Key Block Format

Figure 6:
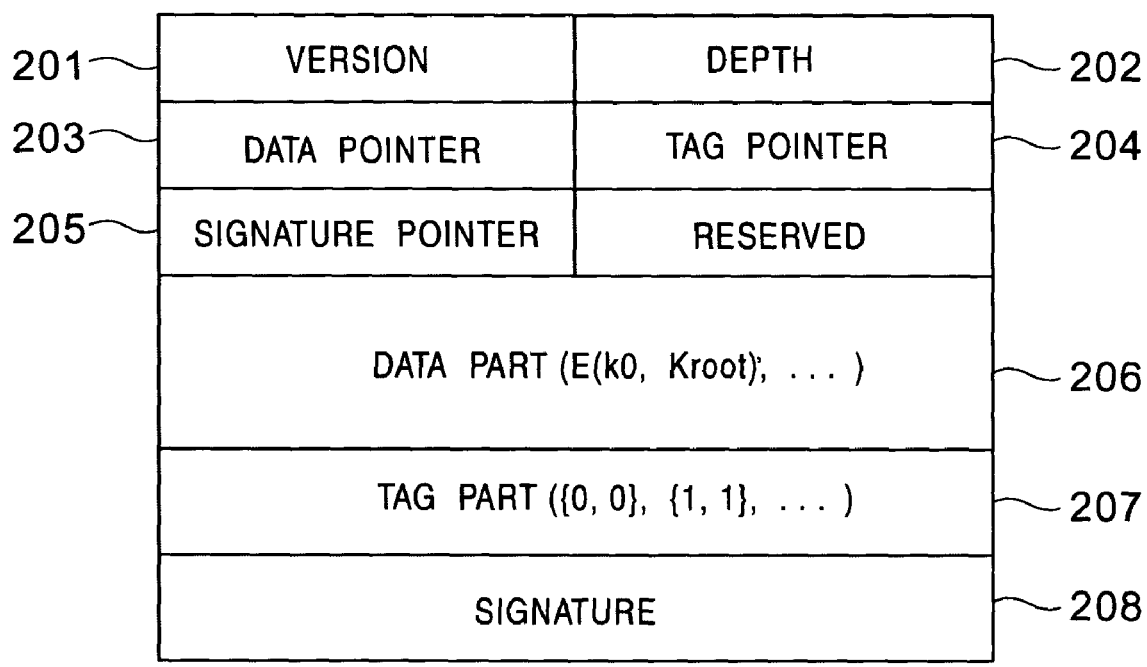
FIG. 6 is an illustration of an example of an enabling key block format.

FIG. 6 shows an example of the format of an enabling key block. "Version" 201 is an identifier representing the version of the enabling key block. The Version 201 has a function of identifying the latest enabling key block and a function of representing correspondence with content. "Depth" 202 represents the number of hierarchical levels in hierarchical tree corresponding to a device to which the enabling key block is distributed. "Data pointer" 203 is a pointer pointing the position of a data part 206 in the enabling key block. "Tag pointer" 204 is a pointer pointing the position of a tag part 207. "Signature pointer" 205 is a pointer pointing the position of a signature.

The data part 206 stores, for example, data obtained by encrypting a node key to be updated. For example, the data part 206 stores encrypted keys concerning the updated node key, as shown in FIG. 5, etc.

Figure 7:
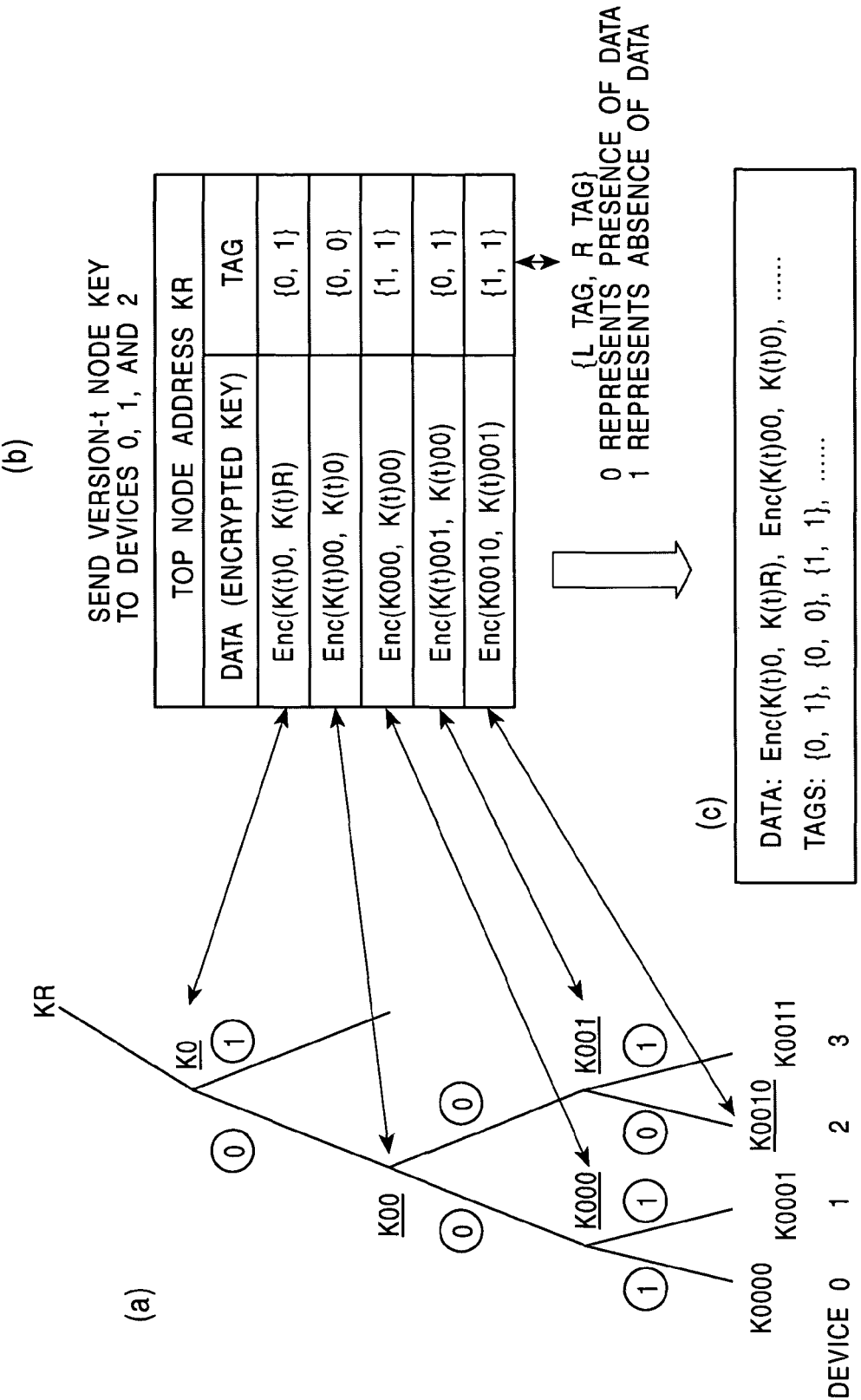
FIG. 7 is an illustration of a configuration of tags in an enabling key block.

The tag part 207 contains tags representing positional relationships of encrypted node keys and encrypted leaf keys which are stored in the data part 206. A rule of tag assignment is described with reference to FIG. 7. FIG. 7 shows a case in which the enabling key block, described using FIG. 4A, is sent as data. The data at this time is shown by the table in part (b) of FIG. 7. The address of a top node included in encrypted keys at this time is used as a top node address. Since this case includes updated key K(t)R obtained by updating a root key, the top node address is KR. Then, for example, data Enc(K (t)0, K(t)R) at the top level is situated in a position in the hierarchical tree in part (a) of FIG. 7. The next data is Enc(K (t)00, K(t)0), and is situated at the lower left of the previous data in the tree. When the data is present, the tag is set to zero, and when the data is absent, the tag is set to 1. The tag is set in the form of {left (L) tag, right (R) tag}. Since data Enc(K (t)0, K(t)R) has data in the left and no data in the right, L tag=0 and R tag=1. Subsequently, tags are set for all pieces of data to form the data string and tag string shown in part (c) of FIG. 7.

Each tag is set in order to indicate where data Enc(Kxxx, Kyyy) is situated in the tree structure. Since key data Enc (Kxxx, Kyyy) . . . stored in the data part 206 is only a simple data row of encrypted keys, the above tags are used to enable indication of the position of each key stored as data in the tree. By using node indices corresponding to encrypted data items, without using the above tags, as described using FIG. 4, for example, data arrangements are possible, such as 0: Enc(K(t)0, K(t)root)
00: Enc(K(t)00, K(t)0)
000: Enc(K(t)000, K(t)00)
. . .

However, the arrangements are not preferable in distribution using a network, etc., because the use of such indices generates redundant data and increases the amount of data. Conversely, by using the above tags as index data representing key positions, a reduced amount of data can determine the position of each key.

Referring back to FIG. 6, the EKB format is further described. "Signature" 208 is an electronic signature executed by, for example, a management system, a content server, a license server, a shop server, or the like, which has a key management center function and which issues an enabling key block. A device which receives an enabling key block uses signature verification to confirm that the received enabling key block is one issued by an authorized enabling-key-block issuer.

5. Category Classification of Trees

Efficient key updating processing, encrypted key distribution, and data distribution are described below in a form in which a hierarchical tree structure defining node keys, etc., is classified by device category.

Figure 8:
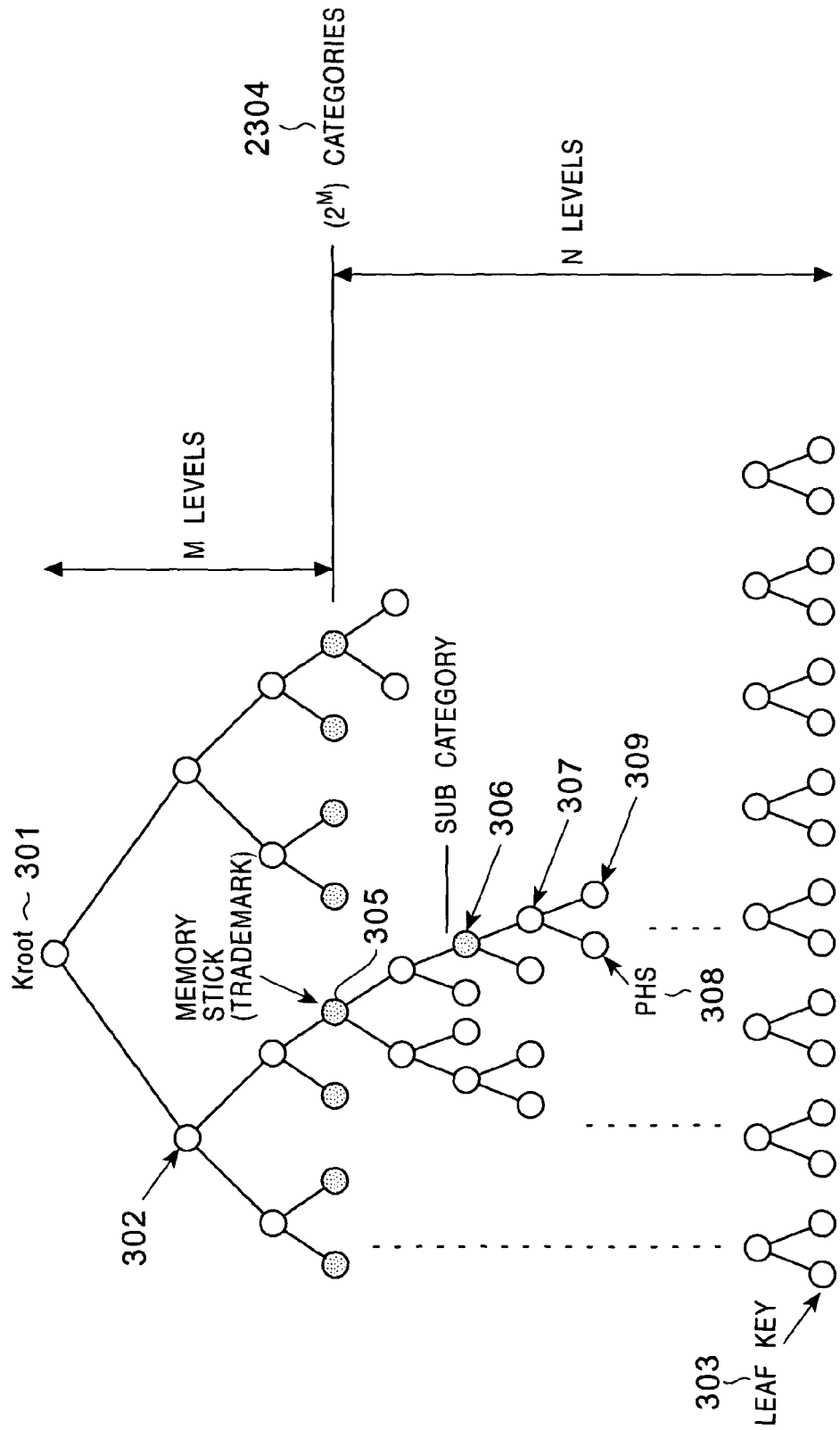
FIG. 8 is an illustration of category classification in tree structure.

FIG. 8 shows an example of category classification of the hierarchical structure. FIG. 8 shows root key "Kroot" 301 is set at the top level of the hierarchical tree structure, a node key 302 set at the subsequent intermediate level, and a leaf key 303 set at the bottom level. Each device possesses its own leaf key, and consecutive node keys and the root key from the leaf key corresponding to the device to the root key.

Here, by way of example, nodes at the M–th level from the top level are set as category nodes 304. In other words, the nodes at the M–th level are used as nodes in each of which a device in a particular category is set. One of the nodes at the M–th level is used as a vertex, and nodes and leaves at the (M+1)-th and lower levels are used as nodes and leaves concerning devices included in the category.

For example, in one node 305 at the M–th level in FIG. 8, category "MemoryStick (trademark)" is set, and the subsequent nodes and leaves connected to the node 305 are set as nodes and leaves which are dedicated to a category including various devices using MemoryStick. In other words, the node 305, and the lower nodes and leaves, are defined as a set of nodes and leaves related to a device defined in the category of the MemoryStick.

Moreover, several lower levels from the M–th level can be set as subcategory nodes 306. For example, as FIG. 8 shows, in a node in a position which is two levels lower than the node 305 corresponding to the category "MemoryStick", a node corresponding to "playback-only unit" is set as a subcategory node included in the category of devices using Memory-Sticks. Below the "playback-only unit" node 306 as a subcategory node, a node 307 corresponding to a music playback telephone, which is included in the category of the playback-only unit, is set, and below the node 307, a node 308 corresponding to a personal handy-phone system and a node 309 corresponding to a cellular phone, which are included in the category of the music playback telephone, can be set.

Categories and subcategories can be set, not only by device type, but also by node which is independently managed by a manufacturer, a content provider, a settlement authority, or the like, that is, in arbitrary units (hereinafter referred to as "entities") such as processing units, control units, or provided service units. For example, by setting a category node as a vertex node dedicated to game machine XYZ sold by a game machine manufacturer, game machine XYZ can be sold in a form in which it stores node keys and leaf keys at levels lower than the vertex node. After that, by creating an enabling key block constituted by the node keys and leaf keys at levels lower than the vertex node, data that can be used only by devices lower than the vertex node can be distributed.

As described above, by employing a configuration in which one node is set as a vertex node and lower nodes are set as categories defined by the vertex node or as related nodes of subcategories, a manufacturer, a content provider, or the like which manages a category level or one vertex node at a subcategory level can independently create and distribute an enabling key block including the node as the vertex to devices at levels lower than the vertex node. This can execute key updating without affecting devices belonging to a node of another category which does not belong to the vertex node.

Figure 9:
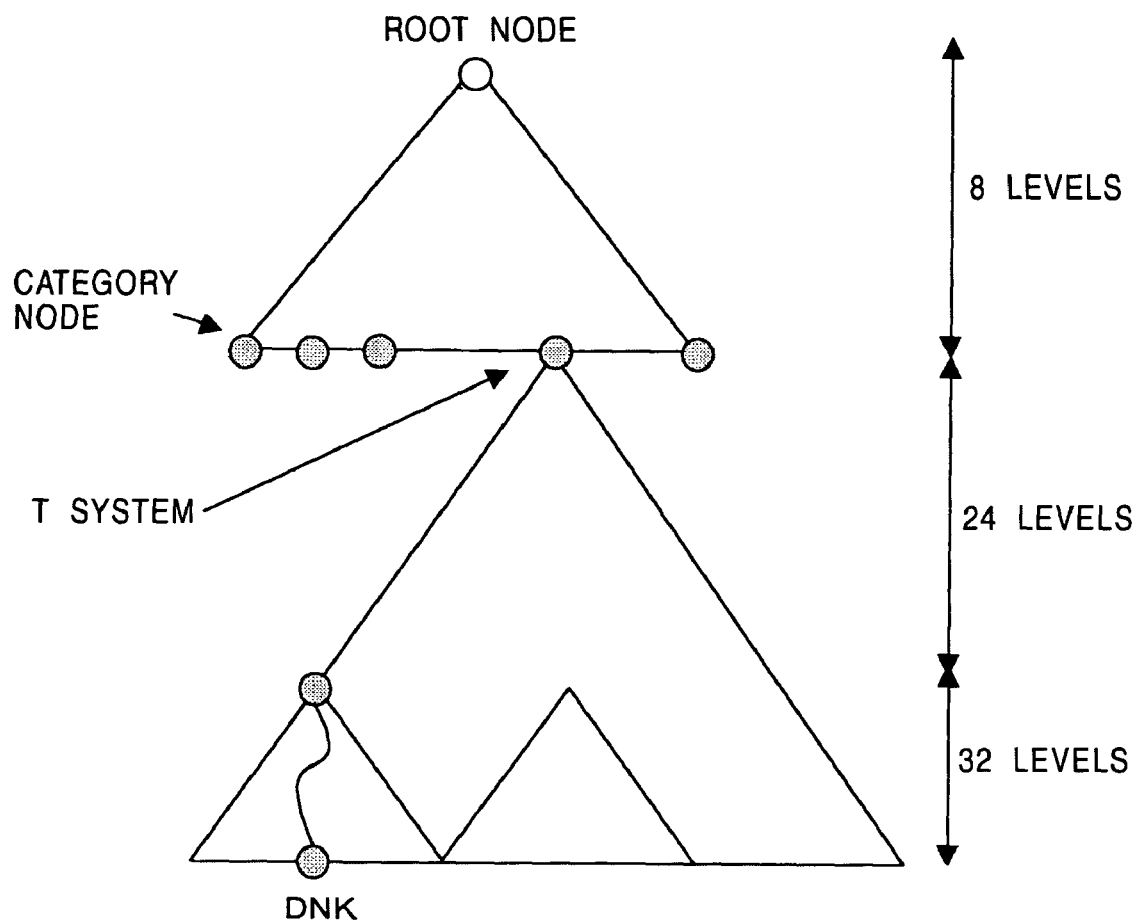
FIG. 9 is an illustration of category classification in tree structure.

In the system of the present invention, as FIG. 9 shows, keys are managed in a tree-structure system. In the example in FIG. 9, nodes at 8+24+32 levels are set to have a tree structure. Nodes from a root node to lower eight levels correspond to categories. The categories in this context mean, for example, a category of devices using semiconductor memories such as MemoryStick, and a category of devices receiving digital broadcasts. This system (hereinafter referred to as the "T system") as a system that manages license corresponds to one of the category nodes.

In other words, keys corresponding to nodes at 24 lower levels from the node of the T system correspond to service providers or services provided by the service providers. Accordingly, in the case in FIG. 9, $2^{24}$ (approximately 16 mega) service providers or services can be defined. In addition, 32 levels in the lowest hierarchy can define $2^{32}$ (approximately 4 giga) users (or user devices). Keys corresponding to nodes on paths from the nodes at 32 levels in the lowest hierarchy to the T system node constitute device node keys (DNKs), and IDs corresponding to leaves at the bottom level are used as leaf IDs.

For example, a content key obtained by encrypting content is encrypted by updated root key KR', and an updated node key at an upper level is encrypted by an updated node key at an adjacent lower level and is disposed in an enabling key block. An updated node key, positioned one level higher than the end of the enabling key block, is encrypted by a node key or leaf key at the end of the enabling key block, and is disposed in the enabling key block.

By using any one of device node keys described in service data, a user device decrypts an updated node key at an adjacent upper hierarchy which is described in an enabling key block distributed with content data. The user device uses the decrypted key to decrypt an updated node key at a higher hierarchy which is described in the enabling key block. By sequentially performing the above processes, the user device can obtain updated root key KR'.

As described above, category classification in the tree enables a configuration in which one node is set as a vertex and lower level nodes are set as categories defined in the vertex node or related nodes of subcategories. A manufacturer, a service provider, or the like which manages a vertex node at a category level or a subcategory level independently creates an enabling key block, whereby a configuration for distribution to devices at lower levels which belong to the vertex node can be formed.

In addition, content distribution and usage form are described below which employ an enabling key block configuration based on a plurality of categories to which the tree-structure device-management enabling-key-block distribution system is applied.

Figure 10:
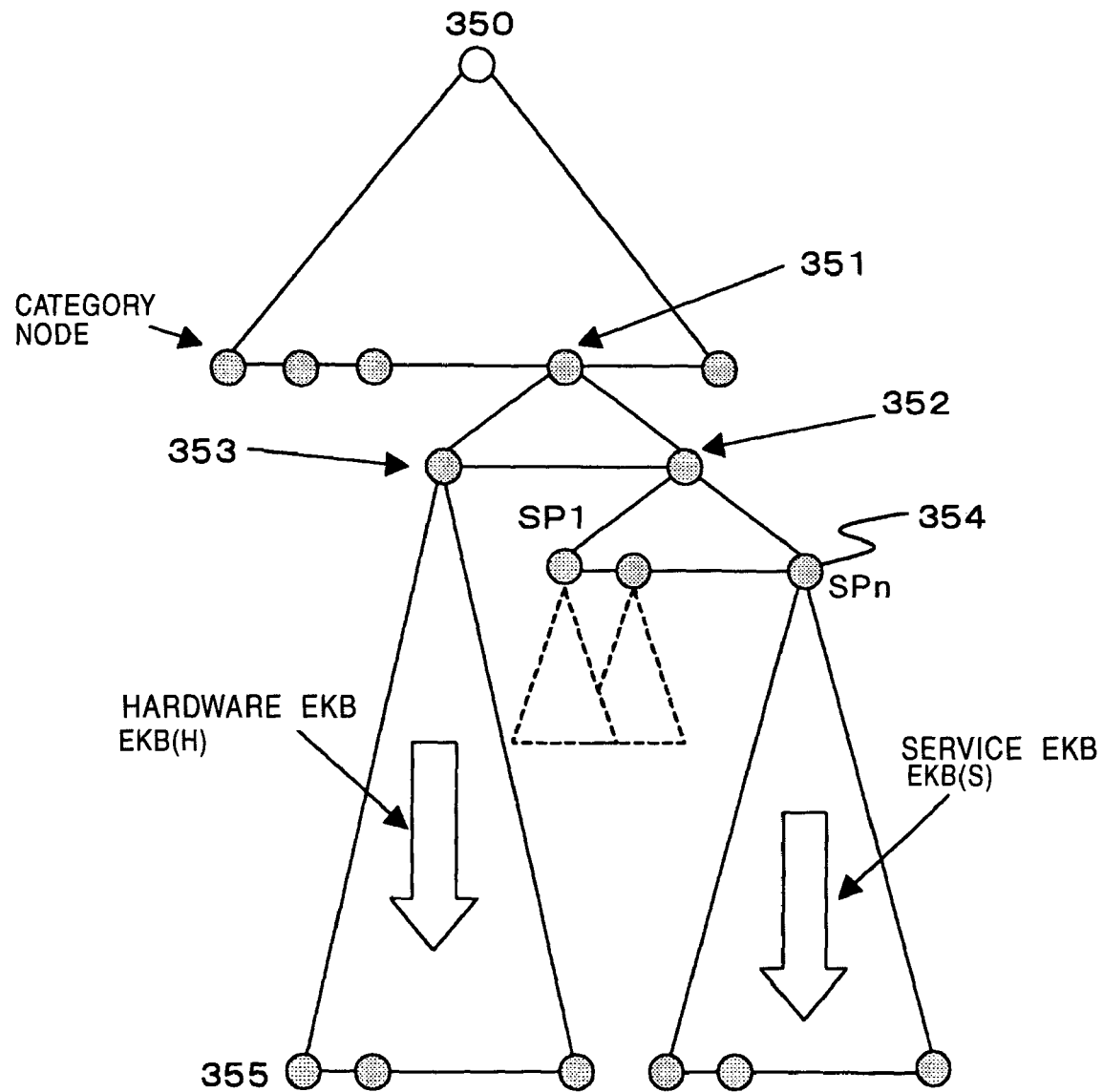
FIG. 10 is an illustration of a specific example of category classification in tree structure.

Two categories are described with reference to FIG. 10. As FIG. 10 shows, below a root node 350, a T-system node 351 is set, and below the T system node 351, a T-service node 352 and a T-hardware node 353 are set. The tree having the T-hardware node 351 as a vertex is a category tree in which user devices themselves are set as leaves 355 and in which hardware enabling key block [EKB(H)] issued for devices is distributed. The tree having the T-service node 352 as a vertex is a category tree in which service enabling key block [EKB(S)] issued for service provided to user devices is distributed.

Enabling key blocks can be decrypted such that hardware enabling key block [EKB(H)] and service enabling key block [EKB(S)] each have a device node key supplied to a device having a valid right, that is, a key corresponding to each node on paths from leaves to the T-system node 351.

6. Purchasing Processing and Audition Processing on Content

Next, details of processing performed when a client purchases or audition content are described below with reference to FIG. 11 and the subsequent figures.

Figure 11:
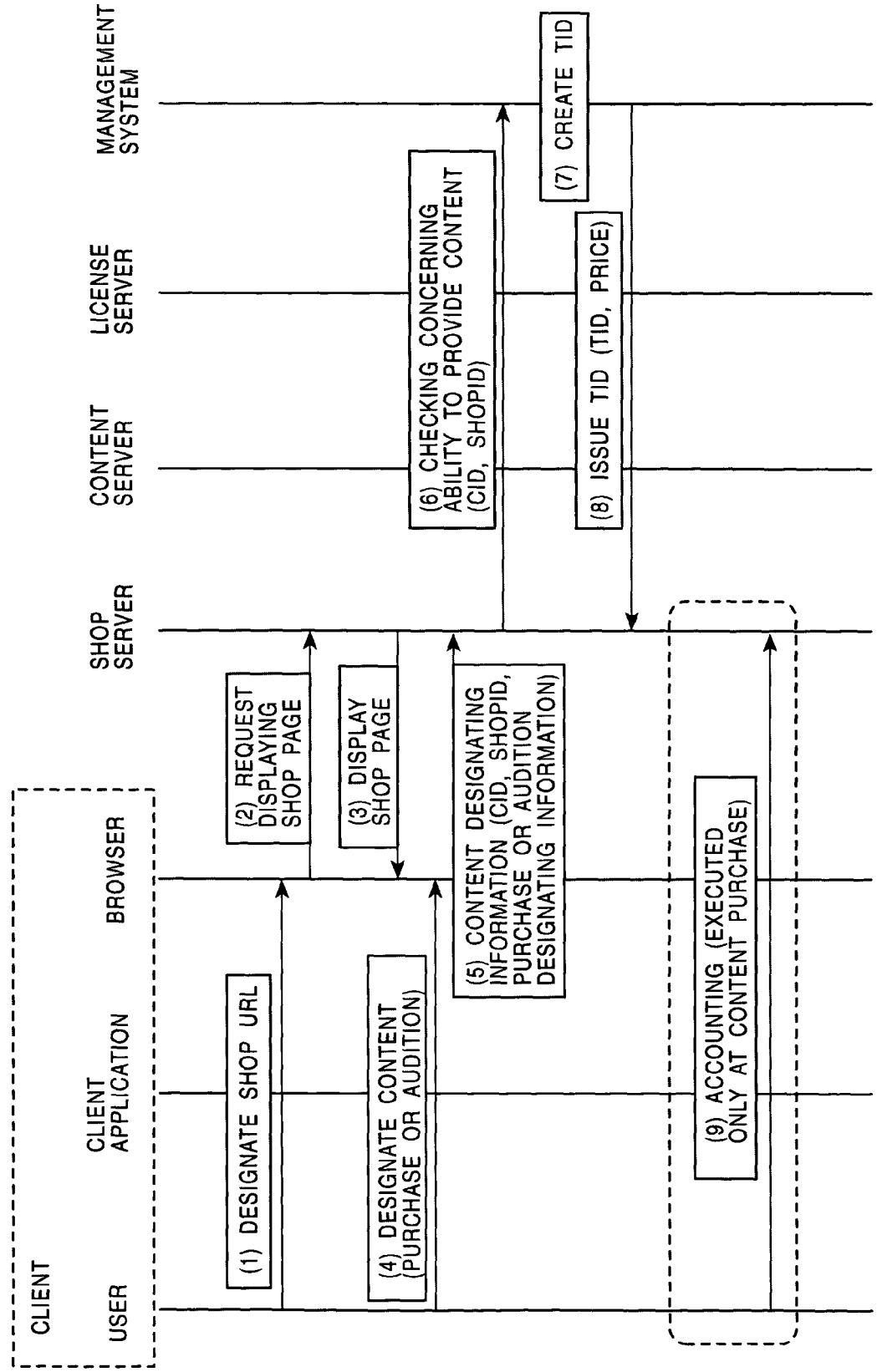
FIG. 11 is a sequence chart (#1) showing processes executed among entities in content purchasing or audition processing.

FIG. 11 shows initial steps of a communication sequence in content purchasing processing executed among a client such as a client application or a personal computer having a browser, a shop server, a content server, a license server, and a management system. The steps shown in the sequence chart of FIG. 11 are described below.

At first, by using the client, a user who tries to purchase content performs designating a uniform resource locator (URL) in a communicatable information processing apparatus such as a user's personal computer (step (1)), reading a content list screen (shop page) provided by the shop server by means of a browser (step (2)), and displaying the content list screen (step (3)).

The client selects content from the content list provided by the shop server and designates either of purchase and audition (step (4)). The client uses the browser to transmit a request data (step (5)). The request data includes a content ID (CID), a shop server identifier (SHOPID), and designation data designating purchase or audition.

After receiving the request to purchase or audition content from the client, the shop server sends, to the management system, a determination request to determine whether to provide content (step (6)). The determination request includes the content ID and the shop ID.

Figure 12:
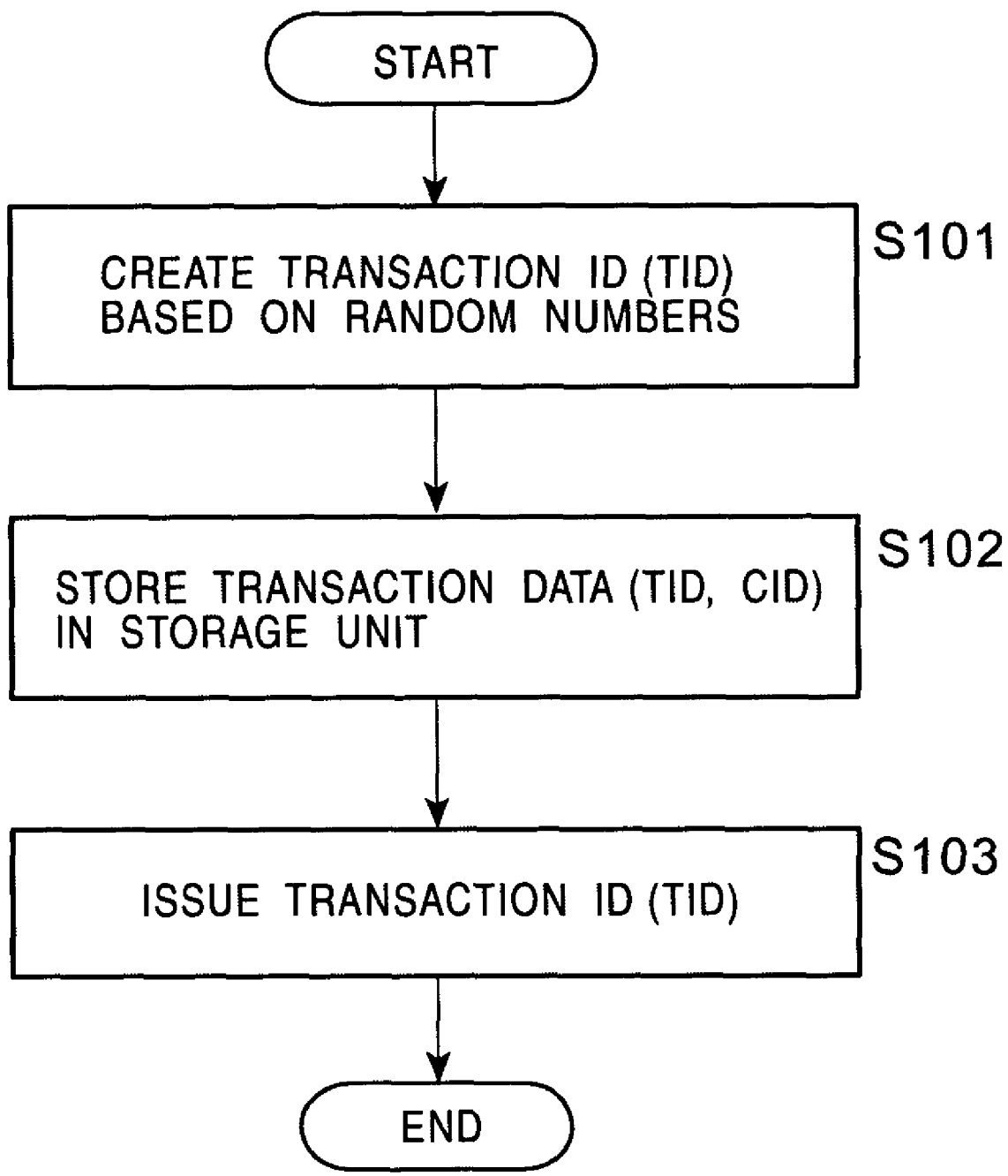
FIG. 12 is a flowchart showing creation and issuance of a transaction ID which are executed by a management system.

When receiving the determination request, the management system executes issuance of a transaction ID (TID) (step (7)). Details of the issuance of the transaction ID are described with reference to the flowchart of FIG. 12.

In step S101, the management system generates random numbers and creates a transaction ID based on the generated random numbers. In step S102, the management system stores, in a storage unit, the created transaction ID and the content ID designated by the shop server so that both are correlated to each other. In step S103, the management system outputs (issues) the created transaction ID for the shop server.

Referring back to the sequence chart in FIG. 11, the management system transmits price information and the created transaction ID as TID information to the shop server (step (8)) after creating the transaction ID. Since the price information is requested only in the case of purchasing the content, it is not included in the TID information in the case of content audition. After receiving the TID information, the shop server executes accounting (step (9)) based on the price included in the TID information when content purchase is requested by the client.

When the request of the client is not content purchase but content audition, the accounting (step (9)) is omitted.

Next, the following processing is described below with reference to the sequence chart of FIG. 13. The shop server transmits, to the management system, a downloading permitting request concerning the content to be purchased or auditioned on condition of execution of accounting in content purchase and on condition of reception of transaction-ID information from the management system (step (10)).

Figure 14:
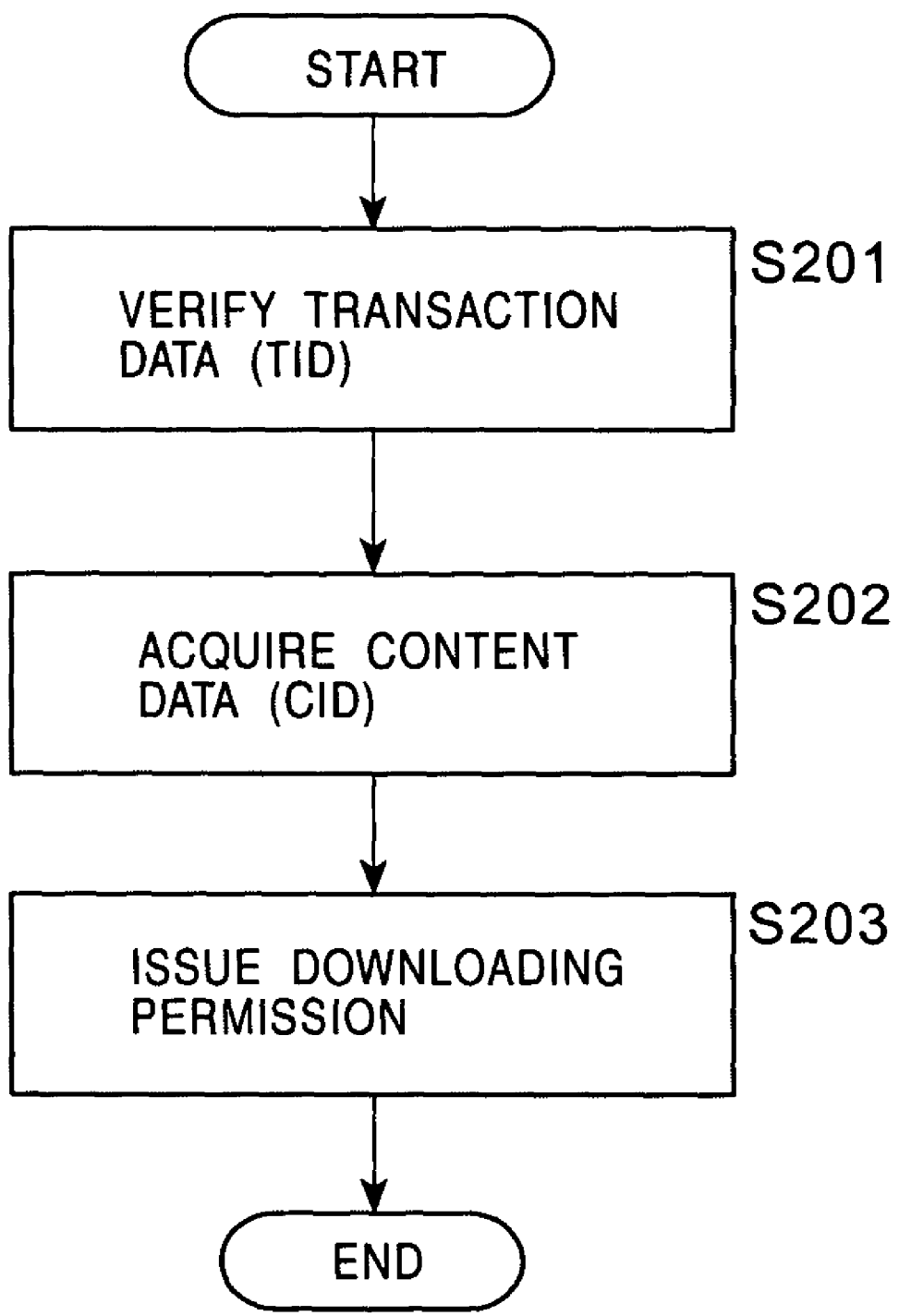
FIG. 14 is a flowchart showing a downloading-permitting-request verifying process.

When receiving the downloading permitting request, the management system executes a downloading-permitting-request verifying process (step (11)). Details of the downloading-permitting-request verifying process are described below with reference to the flowchart of FIG. 14.

In step S201, the management system checks the transaction ID included in the received downloading permitting request with the transaction ID created and stored in the storage unit. In step S202, the management system acquires the content ID recorded correspondingly to the checked transaction ID. In step S203, the management system issues a permission to download content corresponding to the content ID.

Figure 13:
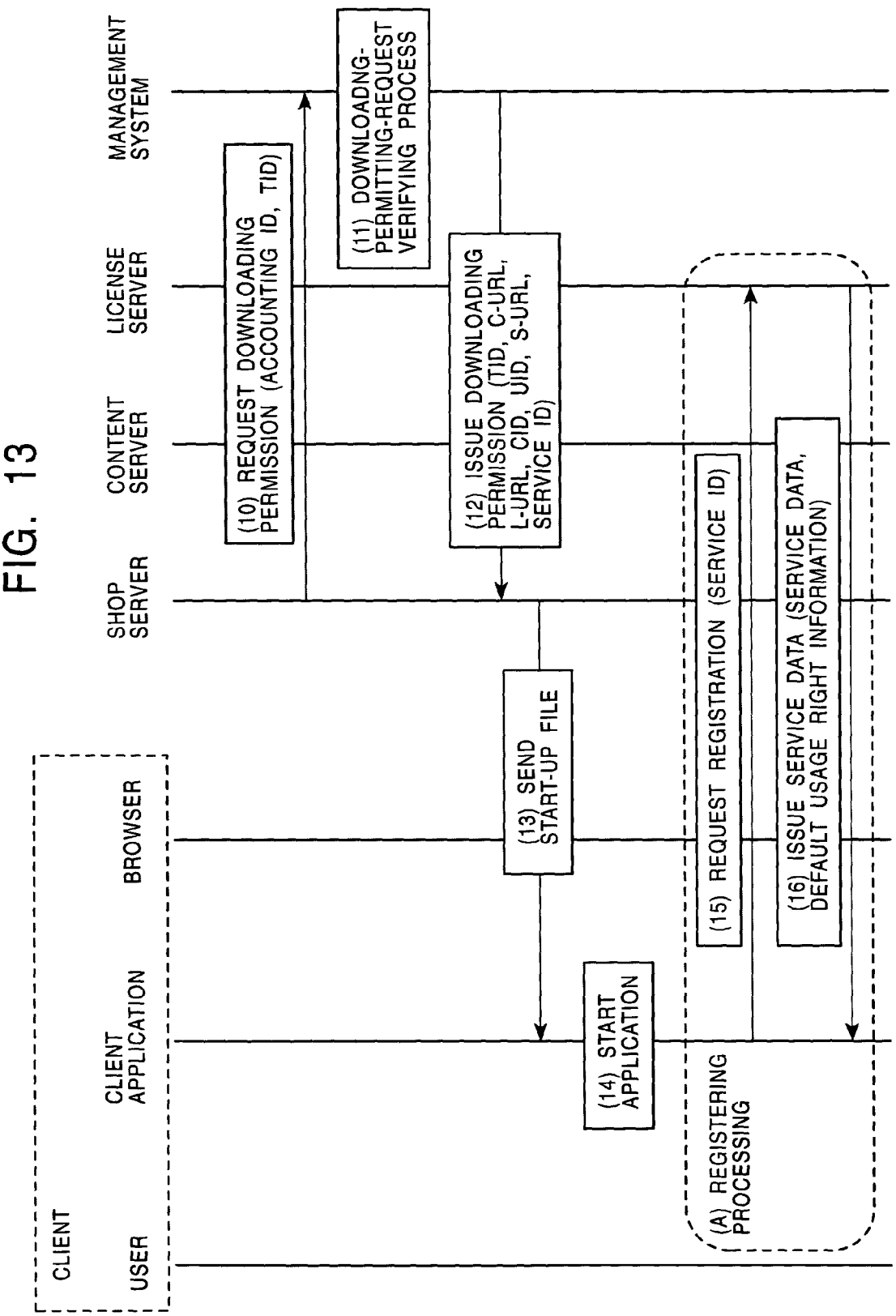
FIG. 13 is a sequence chart (#2) showing processes executed among entities in content purchasing or audition processing.

Referring back to the sequence chart of FIG. 13, the description is continued. After executing the downloading-permitting-request verifying process (step (11)), the management system issues a content downloading permission to the shop server (step (12)). The downloading permission includes a transaction ID (TID), a content server URL (CURL), a license server URL (L-URL), a content ID (CID), a usage information ID (UID), selling item (content) URL (SURL), and a service ID.

When receiving the downloading permitting request from the management system, the shop server creates a start-up file for starting programs for the use (such as playback processing) of content in a client application, and uses the browser to send the start-up file to the client application.

Figure 15:
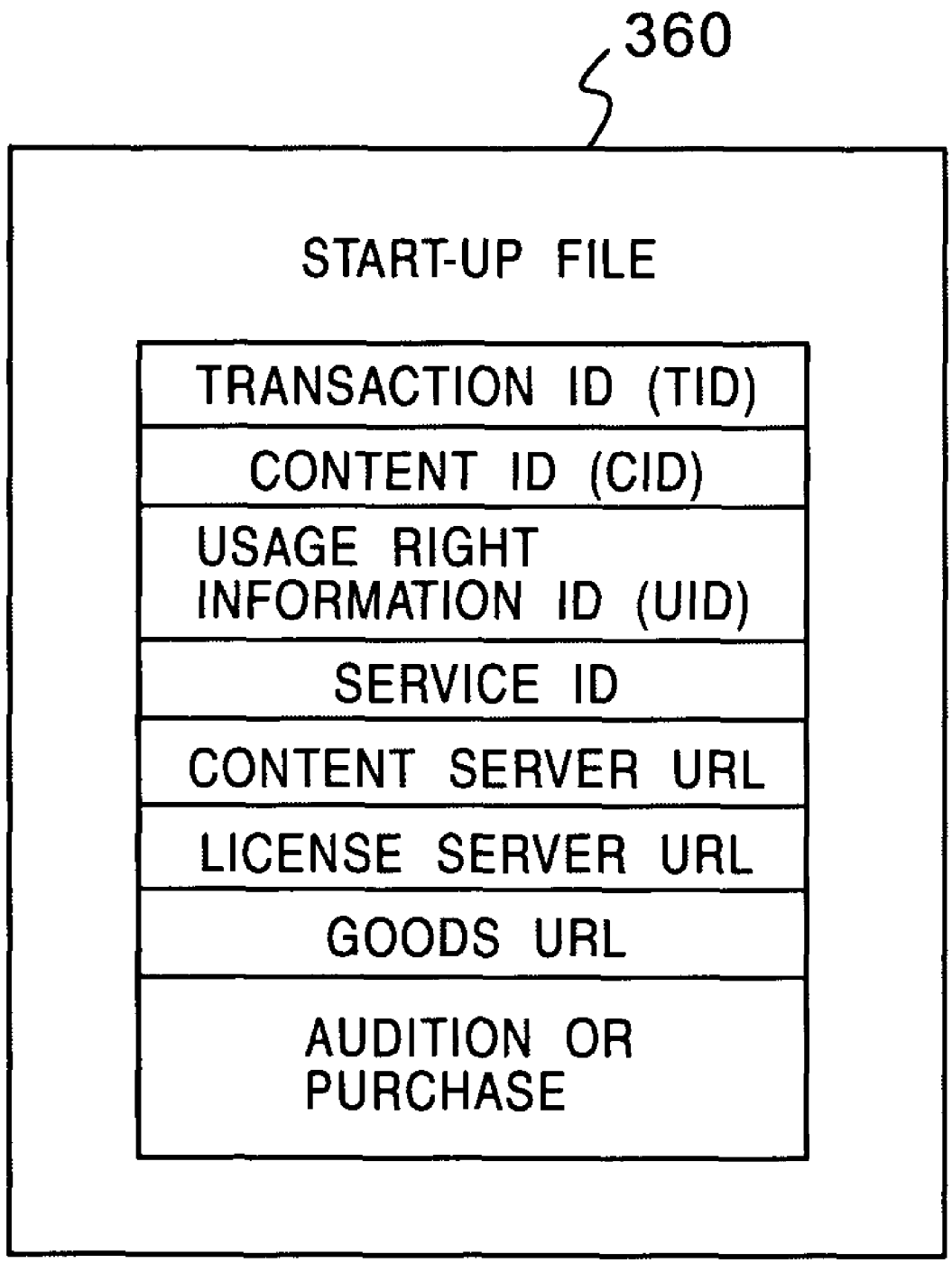
FIG. 15 is an illustration of a data configuration of a start-up file.

An example of the start-up file is described below with reference to FIG. 15.

A start-up file 360 includes the transaction ID (TID) created by the management system, a content ID (CID) of content to be purchased or auditioned by the client, the usage information ID (UID) included in downloading permitting information created by the management system, the service ID included in the downloading permitting information created by the management system, a license server URL, goods (content) URL, and identification data representing the type of processing between purchase or audition.

Regarding the identification data representing the type of processing between purchase or audition, a technique may be performed in which an extension set in the start-up file is set to distinguish between purchase and audition, and is detected by the client application so that each application can start.

The client application starts an application in accordance with the start-up file (step (15)).

A process for starting the application executed in the client application is described below with reference to FIG. 16.

In step S301, it is determined whether or not service data corresponding to the service ID set in the start-up file is stored in an information processing apparatus as a client system.

The service data is received from the license server when the client receives one of various services, for example, a content-use service. The service data is, for example, data permitting a comprehensive service-usage right of services provided by a particular service provider. An example of the configuration of service data 370 is shown in portion (a) of FIG. 17.

Figure 17:
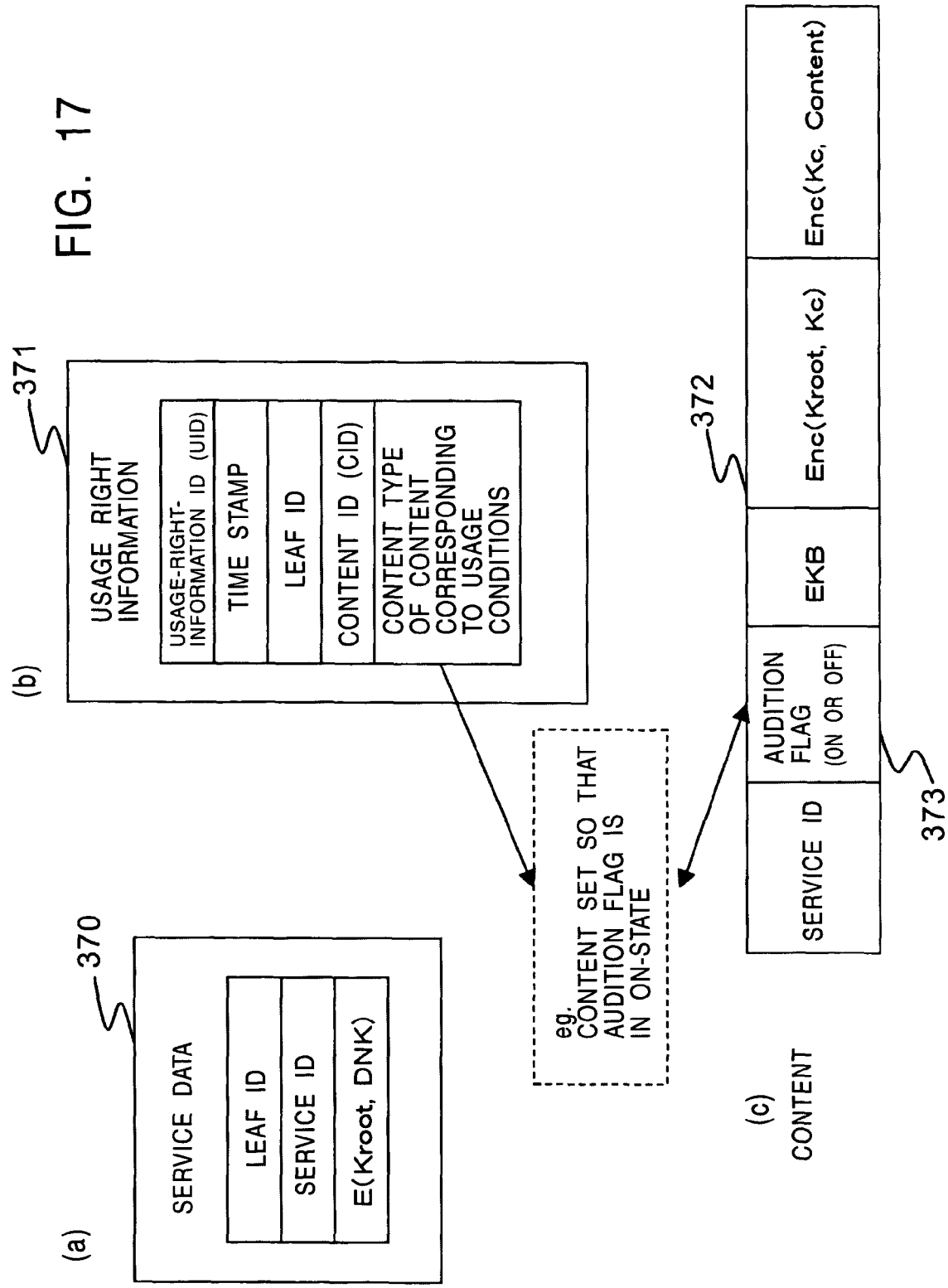
FIG. 17 consists of images showing configurations of service data, usage right information, and content.

As shown in portion (a) of FIG. 17, service data 370 includes a leaf ID unique to the client which is set in the enabling-key-block (EKB) distribution tree, a service ID as a service identifier, data obtained by using a rook key (Kroot) to encrypt a device node key (DNK). To receive the service data 370, the client must perform processing of registration to the license server. The processing of registration corresponds to the steps (15) and (16) shown in FIG. 13.

Figure 16:
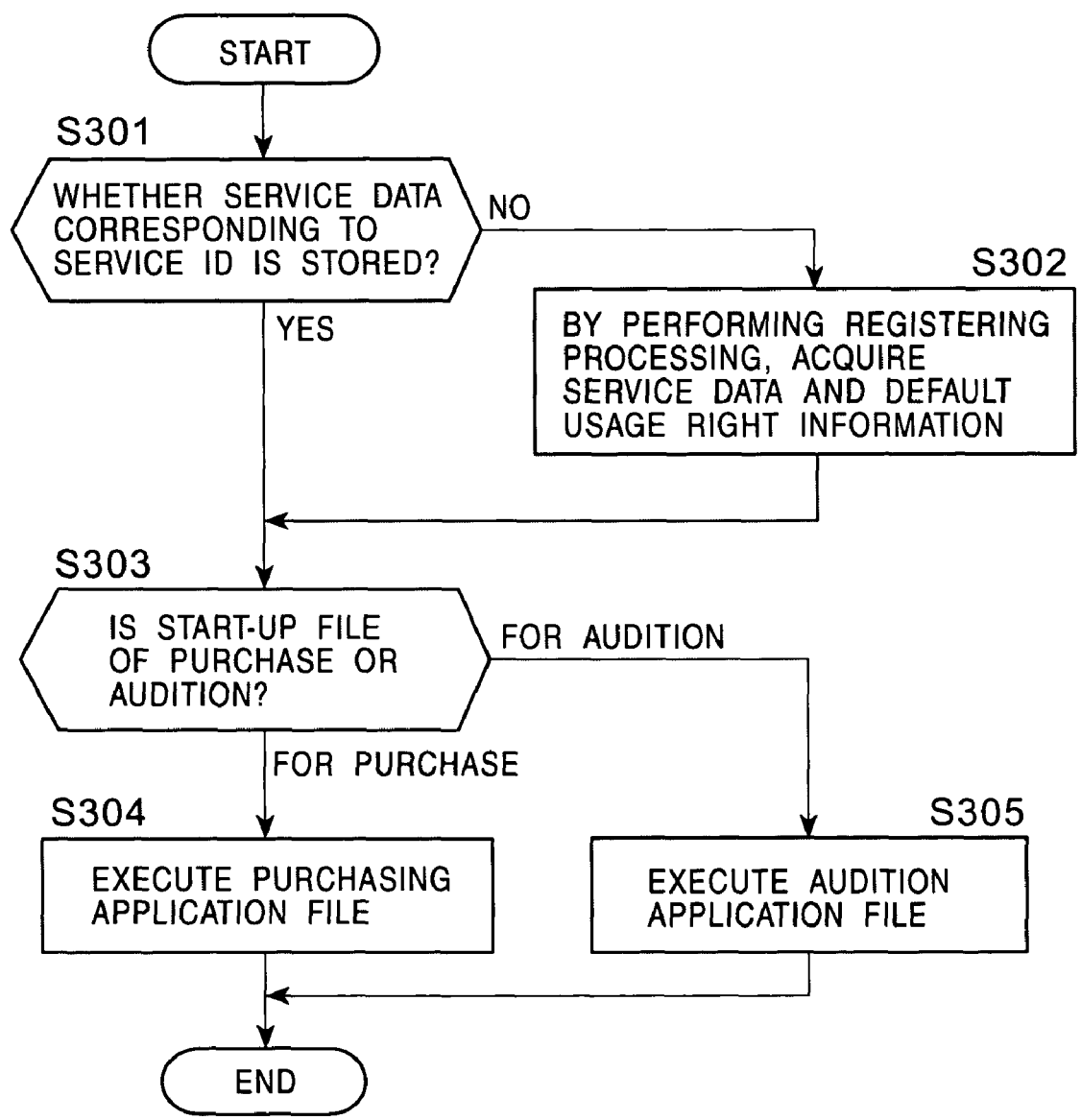
FIG. 16 is a flowchart showing a process for starting the application executed in the client application.

In step S301 in FIG. 16, if it has been determined that the service data corresponding to the service ID is not stored, the processing of registration is executed in step S302, and the service data is received.

In the processing of registration, default usage right information is issued from the license server to the client. Normally, the default usage right information is issued in response to content purchase after usage conditions for the purchase content are stored. However, the default usage right information is not issued on condition of content purchase, but is issued on condition of the processing of registration by the client or of service-data issuing processing. The default usage right information is applied as content-usage-right information to a content audition process (described later).

An example of a data configuration of usage right information is shown in portion (b) of FIG. 17. As shown in portion (b) of FIG. 17, usage right information 371 includes a usage right information ID, a time stamp as issuance date-and-time information, a leaf ID unique to the client, and a content ID and content-type information of content corresponding to usage conditions when the usage right information 371 is directed to content.

When the usage right information 371 has default settings, it is not issued in response to particular purchased content. Thus, the content ID is omitted, or an ID common to auditionable pieces of content is set. Also, the content-type information of content corresponding to usage conditions is set such a manner that the use of content set so that, for example, an audition flag is in onstate is permitted. As portion (c) of FIG. 17 shows, content 372 includes an audition flag 373. When the audition flag 373 is in on-state, it indicates that audition of the content 373 is permitted. When the audition flag 373 is in off-state, it indicates that audition of the content 373 is not permitted.

When audition content is played back, the client application determines whether to permit playback by referring to the default usage right information, and plays back the content by executing content flag verification. This process is described below.

Referring to the flowchart in FIG. 16, the application starting process is described below.

After, in step S302, the processing of registration, that is, acquisition of the service data and the default usage right information ends, in step S303, it is determined which of a purchasing application start-up file and an audition application start-up file the start-up file received from the shop server is. In the case of the purchasing application start-up file, the process proceeds to step S304 and the purchasing application is executed. In the case of the audition application start-up file, the process proceeds to step S305 and the audition application is executed.

Figure 18:
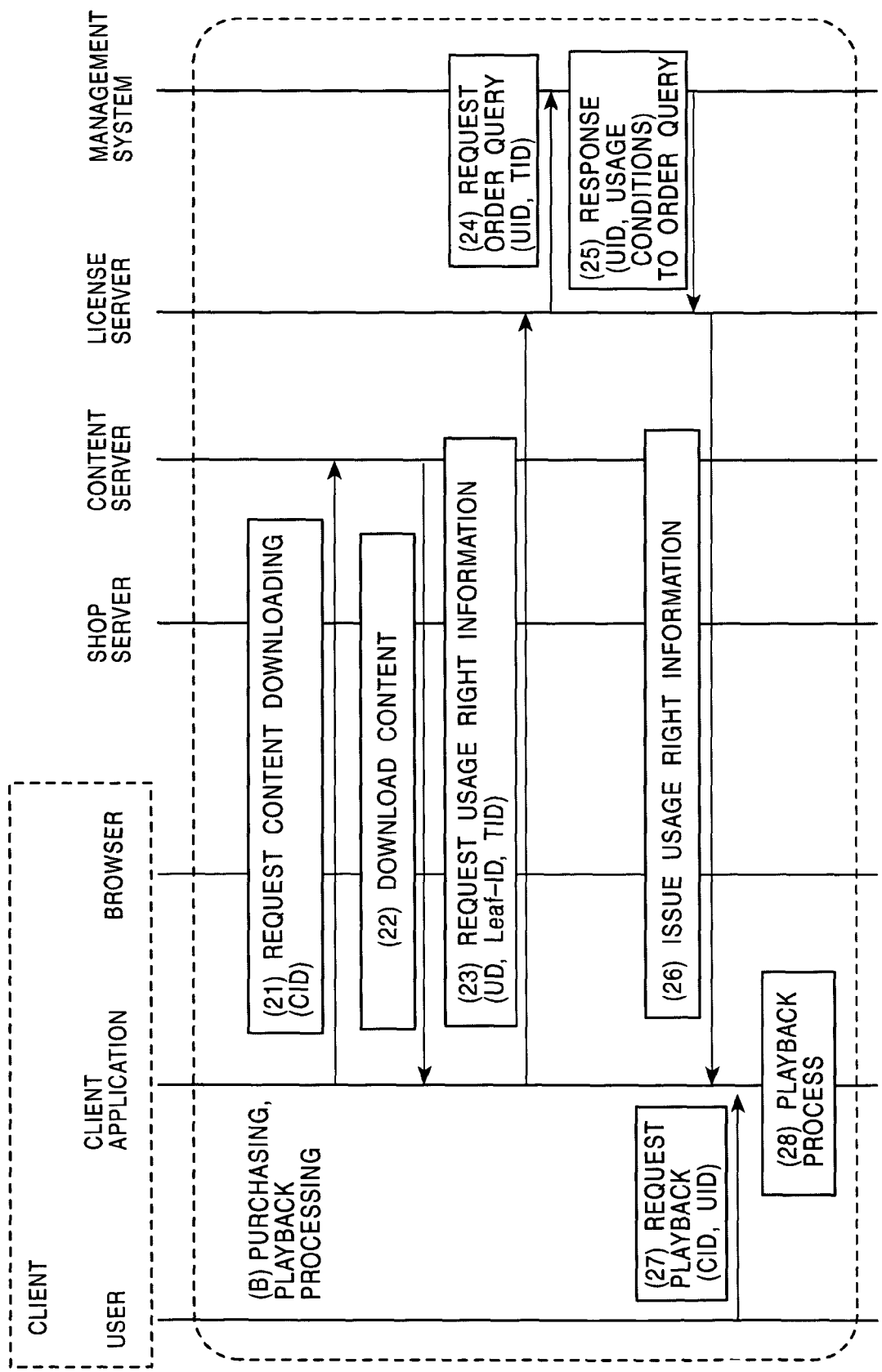
FIG. 18 is a sequence chart showing processes executed among entities in content purchasing processing.

Next, the execution sequence of the purchasing application is described below with reference to the sequence chart of FIG. 18.

In the case of executing the purchasing processing, the client application executes a content downloading request to the content server (step (21)). The requested content has already been requested for purchase and corresponds to the content ID recorded in the usage right information (see portion (b) of FIG. 17). The client application uses the content ID to designate content and executes the content downloading request to the content server.

When receiving the content downloading request, the content server transmits, to the client, content information corresponding to the content ID (step (22)). The content information includes encrypted content. Specifically, as shown in portion (c) of FIG. 17, the content information includes encrypted content data Enc(Kc, Content) obtained by encryption using content key Kc, data Enc(Kroot, Kc) obtained by using root key Kroot to content key Kc, an enabling key block (EKB) for acquiring root key Kroot, audition flag data, a service ID.

After receiving the content information, the client transmits, to the license server, a request to acquire usage right information corresponding to the received content (step (23)). This request includes the usage right information ID (UID) included in the start-up file (see FIG. 15) already received from the shop server, a leaf ID as client identifying data, and the transaction ID (TID) included in the start-up file (see FIG. 15) already received from the shop server.

After receiving the usage right information, the license server performs an order query process on the management system (step (24)). This request includes the user ID (UID) and the transaction ID (TID). After receiving the order query, the management system transmits, to the license server, as a response to the query, response information in which usage conditions corresponding to the usage right information ID (UID) are set (step (25)).

After receiving the response information, the license server creates usage right information in which content usage conditions are set, and issues the information to the client (step (26)). The content usage conditions include the number of times content is played back, a time limit, permission information on various processes such as copying to an external unit and a check-out process.

After receiving the usage right information, the client is allowed to use the content already received from the content server based on the usage conditions recorded in the usage right information. When receiving from the user a content playback request (step (27)) designating a content ID and usage right information, the client application executes a playback process in accordance with the usage conditions.

Figure 19:
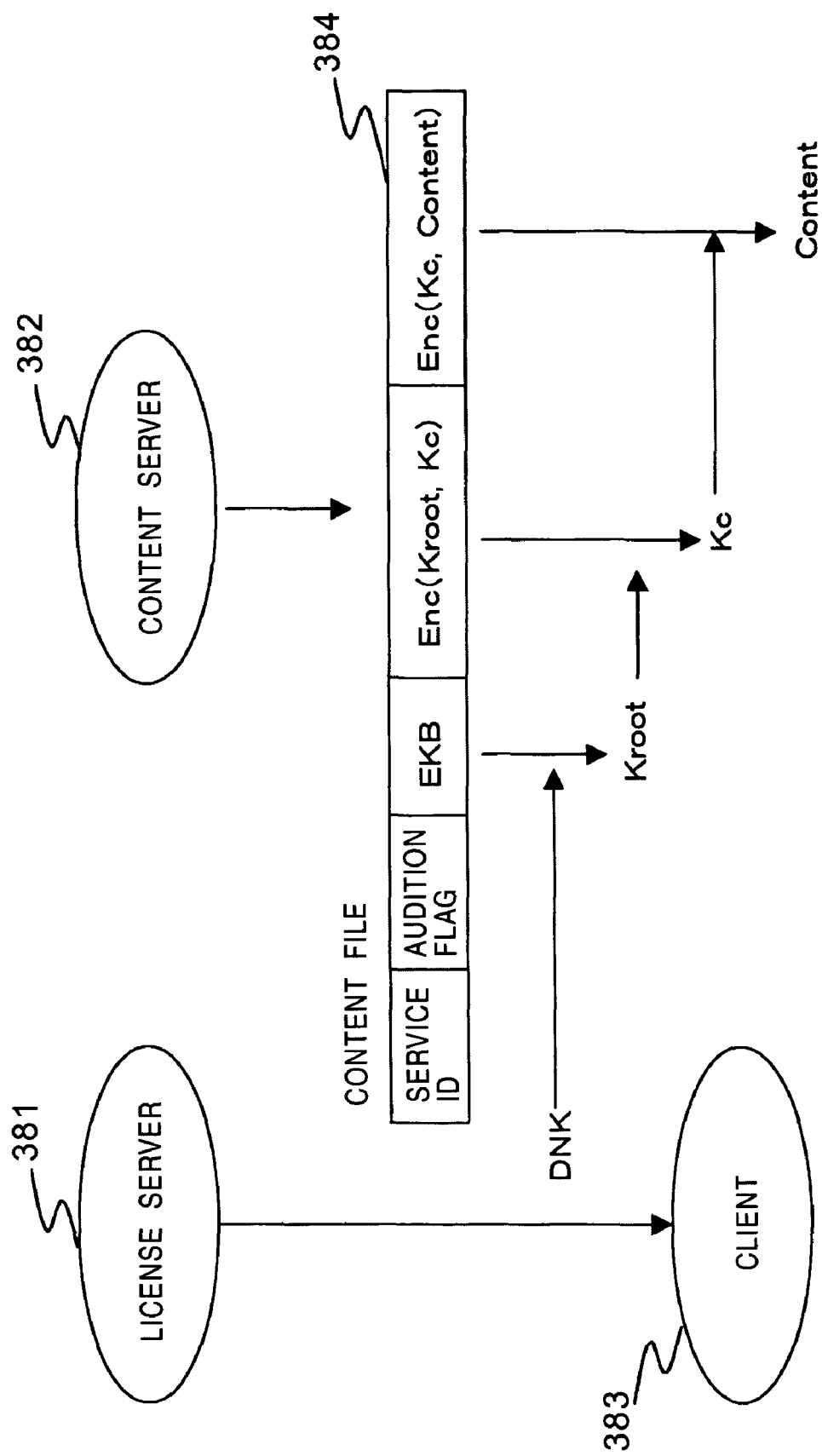
FIG. 19 is an illustration of an outline of content playback processing.

A basic procedure for the content playback process is described below with reference to FIG. 19.

As can be understood from the above description, the content is provided from a content server 382 to a client 383, and service data and usage right information are supplied as a license from a license server 381 to the client 383.

The content has a form (represented by Enc(Kc, Content)) encrypted by content key Kc. Content key Kc is obtained from root key Kroot that can be acquired from an enabling key block.

The client 383 acquires a device node key (DNK) from the service data received from the license server 381, and acquires root key Kroot by performing decryption based on the acquired device node key on the enabling key block of a content file. The client 383 further acquires content key Kc by using the acquired root key Kroot to decrypt Enc(Kroot, Kc). By using the acquired content key Kc to execute decrypting encrypted content Enc(Kc, Content), the content is acquired and played back in the client 383.

Details of the content playback process which is correlated with the service data and the usage right information are described below with reference to FIG. 20.

Figure 20:
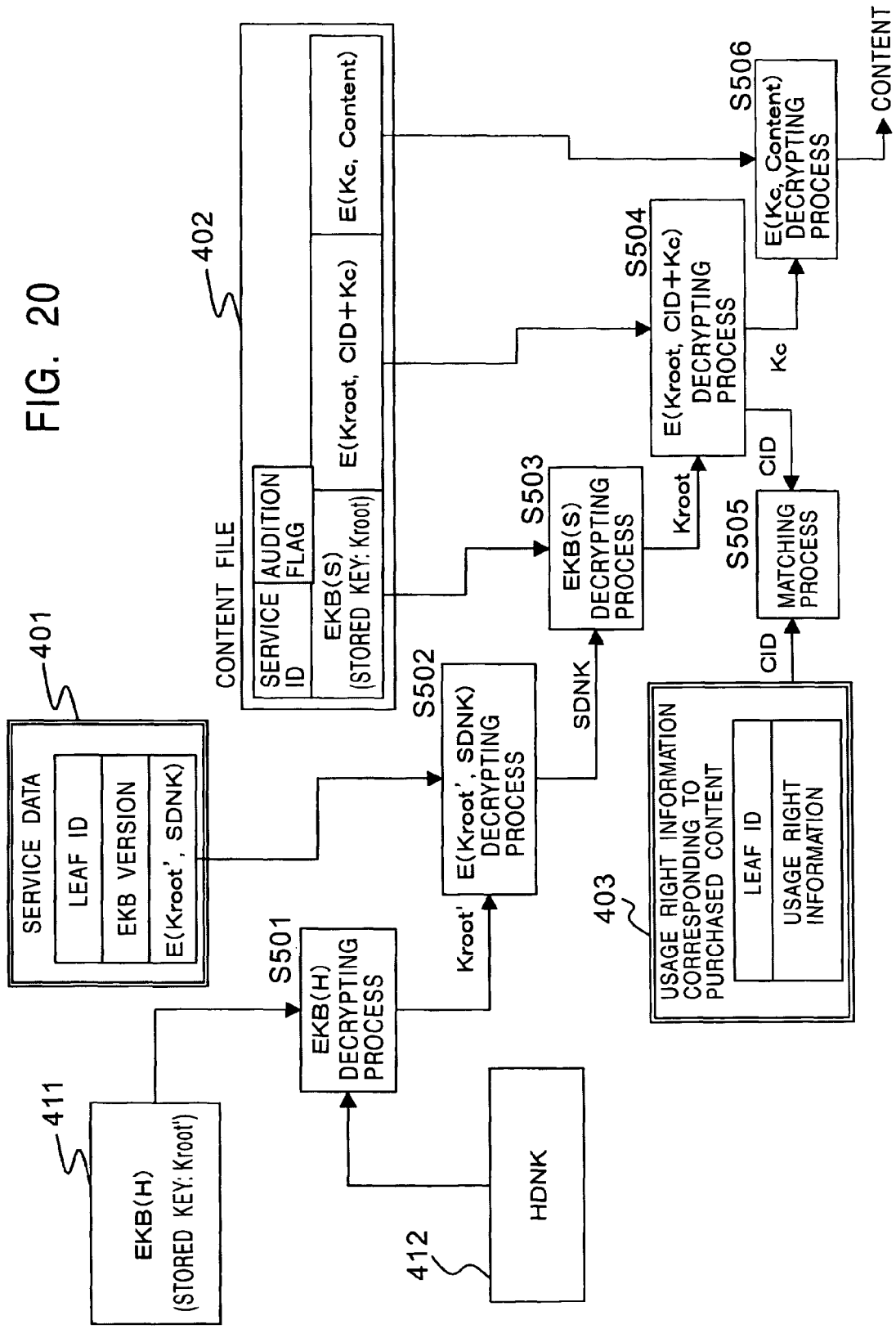
FIG. 20 is an illustration of examples of content decrypting and utilizing processing using an enabling key block.

FIG. 20 illustrates a content usage processing sequence based on content decryption processing to which hardware enabling key block [EKB(H)] and service enabling key block [EKB(S)] are applied.

The service data 401 and usage right information 403 in FIG. 20 are received from a license server, and the encrypted content file 402 shown in FIG. 20 is received from a content server. The service data 401 includes a leaf ID as a leaf identifier, an enabling key block version to be applied, and data E(Kroot', SDNK) obtained by encrypting the service device node key (SDNK) required for decrypting service enabling key block [EKB (S)] by using root key "Kroot'" set correspondingly to a hardware category tree.

The encrypted content file 402 includes service enabling key block [EKB(S)] storing root key Kroot which is set correspondingly to a service category tree, data E(Kroot, CID+Kc) obtained by using root key Kroot to encrypt a content ID (CID) and content key Kc which is used in content encryption and decryption, and data E(Kc, Content) obtained by using content key Kc to encrypt content.

The usage right information 403 includes a leaf ID and content usage condition information. The content usage condition information includes various conditions such as the period of use which is set correspondingly to content, the number of times the content is used, and copy restriction. After receiving the usage right information 403, the user device stores the usage right information 403 as security information corresponding to the content, or stores the usage right information 403 in an AV index file as content index data.

By way of example, in a user device as a PC, or the like, which includes a large capacity storage unit and high power of a processor, etc., the usage right information can be stored as security information corresponding to the content. Accordingly, it is preferable that, by storing all the usage right information, processing be performed with reference to all the usage right information when the content is used. In a user device such as a portable device having no large capacity storage unit and low power of a processor or the like, the usage right information 403, which is formed by selected information, is stored in an AV index file as index data, whereby it is possible that processing be performed with reference to the usage condition information in the AV index file when the content is used.

In the step S501 shown in FIG. 20, the user device acquires root key "Kroot'" set correspondingly to the hardware category tree from EKB(H) 411 by executing a decrypting process on EKB(H) 411 for hardware by applying hardware device node key (HDNK) 412. Enabling key block processing to which the device node key is applied complies with the technique described with reference to FIG. 5.

Next, in step S502, by using the rook key "Kroot'" extracted from [EKB(H)] to execute decryption on encrypted data E(Kroot', SDNK) in the service data 401, the user device acquires device node key (SDNK) for use in processing (decryption) of service enabling key block [EKB(S)].

In step S503, by using the device node key (SDNK) extracted from the service data 401 to execute processing (decryption) on the service enabling key block ([EKB(S)]) stored in the encrypted content file 402, the user device acquires root key Kroot which is set correspondingly to the service category tree and which is stored in service enabling key block [EKB(S)].

In step S504, by using the root key Kroot extracted from service enabling key block [EKB(S)] to execute decryption on the encrypted data E(Kroot, CID+Kc) stored in the encrypted content file 402, the user device acquires the content ID (CID) and content key Kc.

In step S505, a matching process on the content ID (CID) extracted from the encrypted content file 402 and the content ID stored in the usage right information is executed. After the matching process confirms that the content is usable, in step S506, by using the content key Kc extracted from the encrypted content file 402, the encrypted content E(Kc, Content) stored in the encrypted content file 402 is decrypted and the content is played back.

As described above, by separately providing users with hardware enabling key block [EKB(H)] as an enabling key block corresponding to a category tree set correspondingly to hardware as a device using content, and service enabling key block [EKB(S)] as an enabling key block corresponding to a category tree set correspondingly to a service using content, only a user who has a valid device node key corresponding to each enabling key block can use service.

A device node key for decrypting service enabling key block [EKB(S)], that is, SDNK, can be provided as the service data 401 corresponding to content, and the SDNK is encrypted by using root key "Kroot'" which is set correspondingly to the hardware category tree and which can be acquired only by a device having a valid device node key for hardware, that is, HDNK. Thus, only a user device having a valid HDNK can acquire the SDNK and can use service.

In addition, in the use of content, the matching process on the content ID extracted from the encrypted content file 402 and the content ID extracted from the usage right information is executed. Thus, a state in which the content ID information is stored after acquiring the usage right information 403 can be used as an essential condition, whereby the use of content complying with the usage conditions is realized.

Next, processing in a case in which the process of the client application is performed by an application for executing the audition processing is described below with reference to the sequence chart of FIG. 21.

In the case of the audition processing, similarly to the content purchasing processing, the content information file (see FIG. 19) is acquired and stored in the storage unit of the client system, and can be subsequently played back by processing similar to that for purchased content. However, a case in which streaming playback processing is executed without storing the content information file in the storage unit is described below with reference to FIG. 21.

In the case of executing the streaming audition processing, the client application executes a content downloading request to the content server (step (31)). The content has already been requested for audition. The client application uses a content ID (CID) to designate content and executes requesting the content server to download the content.

In the case of streaming playback, the content server consecutively transmits partial data (content part) of content to the client (step (32)). After receiving the content part, the client executes a playback process on the received content (step (33)), and transmits the following content part request to the content server. By consecutively executing this processing, streaming playback is performed.

Figure 22:
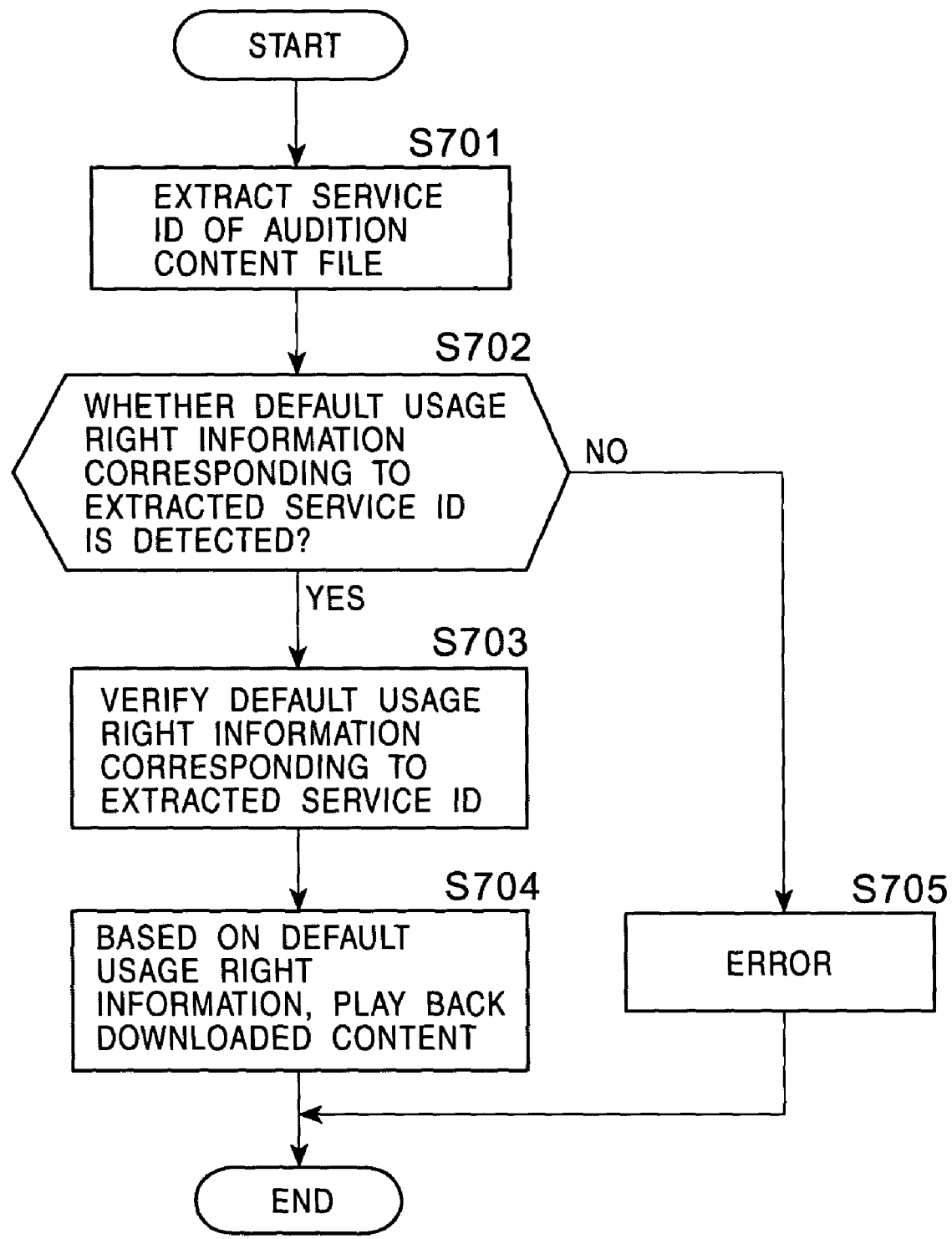
FIG. 22 is a flowchart showing an outline of an audition playback process.

An audition playback process is described below with reference to the flowchart of FIG. 22.

In step S701, the client application acquires a service ID from the audition content file received from the content server.

In step S702, it is determined whether default usage right information (see portion (b) of FIG. 17) corresponding to the extracted service ID is detected. The default usage right information is usage right information that is transmitted from the license server with the service data (see portion (a) of FIG. 17) when processing of registration of the client is performed. The default usage right information is usage right information which is usable for auditionable content differing from usage right information issued for purchased content.

In content audition, it is an audition-executing permitting condition to possess default usage right information. If no default usage right information is not possessed, the process proceeds to step S705, and this state is regarded as an error and the process ends without executing content playback.

When the default usage right information is stored, in step S703, the default usage right information is verified to confirm the recording of the usage right information. The default usage right information includes, for example, information concerning permission for audition of content in which an audition flag is in on-state, or content ID information of auditionable content. This information is then acquired.

In step S704, the content is played back based on the usage conditions of the default usage right information. The playback processing includes decrypting the encrypted content received from the content server, as described with reference to FIGS. 19 and 20.

Similarly to playback of the purchased content described with reference to FIG. 20, also in audition processing that does not involve content purchasing, it is required that a key for decrypting content be acquired by key acquiring processing based on enabling key block processing. For example, a configuration is used in which content playback can be executed only by a user who retains a valid device node key which corresponds both to hardware enabling key block [EKB(H)] corresponding to the category tree set correspondingly to hardware as a content utilizing device, and to service enabling key block [EKB(S)] corresponding to the category tree set correspondingly to a content utilizing service. Thus, also in audition, playback authority can be set in a limited range.

As described above, in the case of processing of registration to the license server, the client acquires default usage right information, and enables content playback based on the default usage right information in the case of audition processing which does not involve content purchasing processing. Also, the user can play back content for audition without executing content purchase, and clients who are allowed for audition are limited to those that perform registering to the license server and have default usage right information. Therefore, audition data can be prevented from being disorderly spread.

Figure 21:
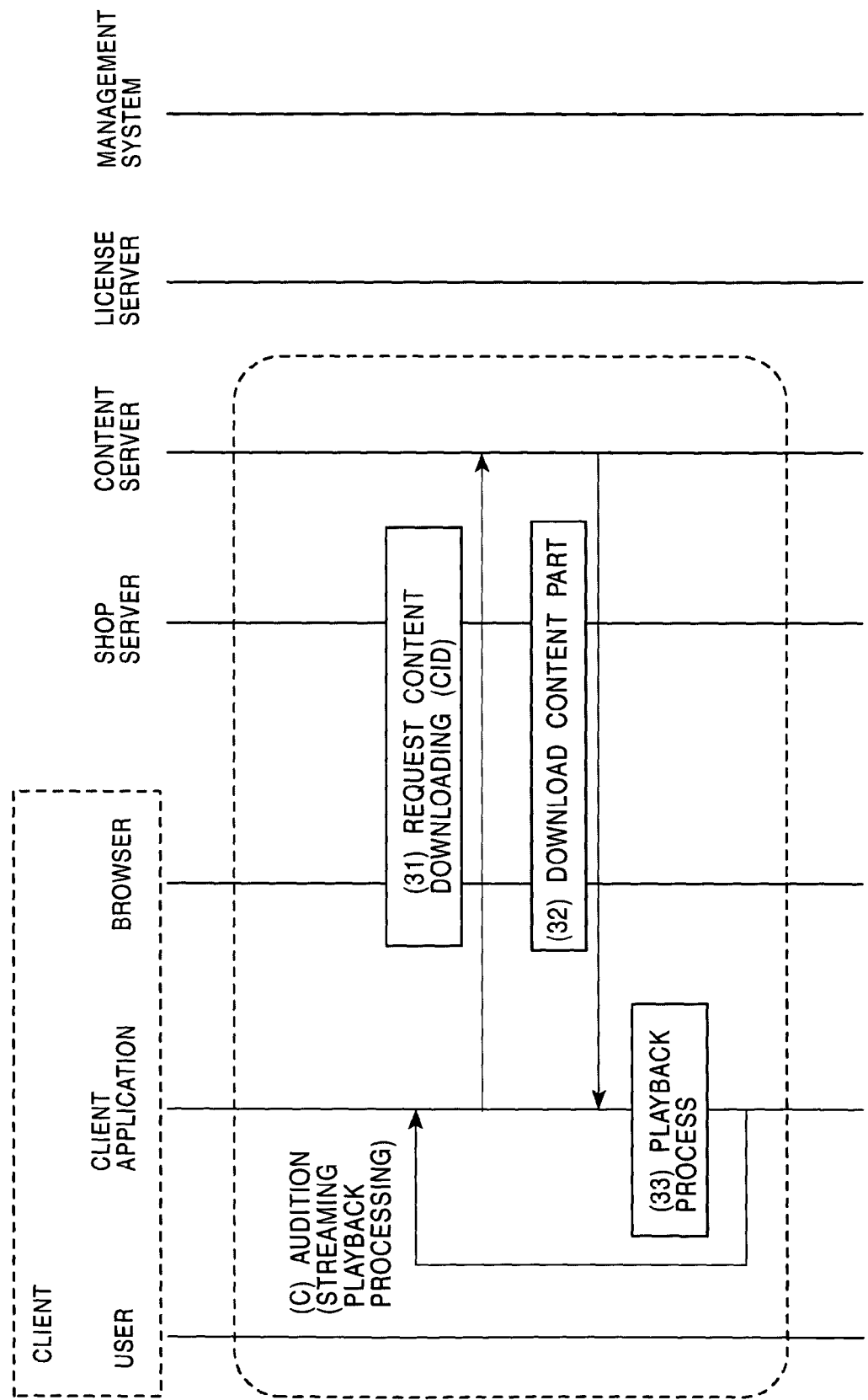
FIG. 21 is a sequence chart showing processes executed among entities in content audition processing.

The sequence chart of FIG. 21 shows an example of streaming playback. However, a sequence can also be employed which includes storing audition data in a recording medium of the client, determining, in a playback mode, whether default usage right information is detected, and performing content playback based on the recording of the default usage right information.

7. Backup/restoring Processing

Next, backup processing and restoring processing on content purchased by the client and content usage right information are described below.

The restoring processing is executed as re-acquisition and storage processing (which are executed when the client purchases content or after purchase) on license information for content, that is, service data and usage right information, or as content re-acquiring processing.

Regarding a processing form, any one of service data, usage right information, and content can be re-acquired, or all the data of these types can be re-acquired. The following embodiment describes re-acquisition and storing sequence of all the data of service data, usage right information, and content. However, the present invention is not always limited to re-acquisition of all the data, but only any type of data can be selectively re-acquired.

Details of the backup/restoring processing are described below with reference to FIG. 23.

Figure 23:
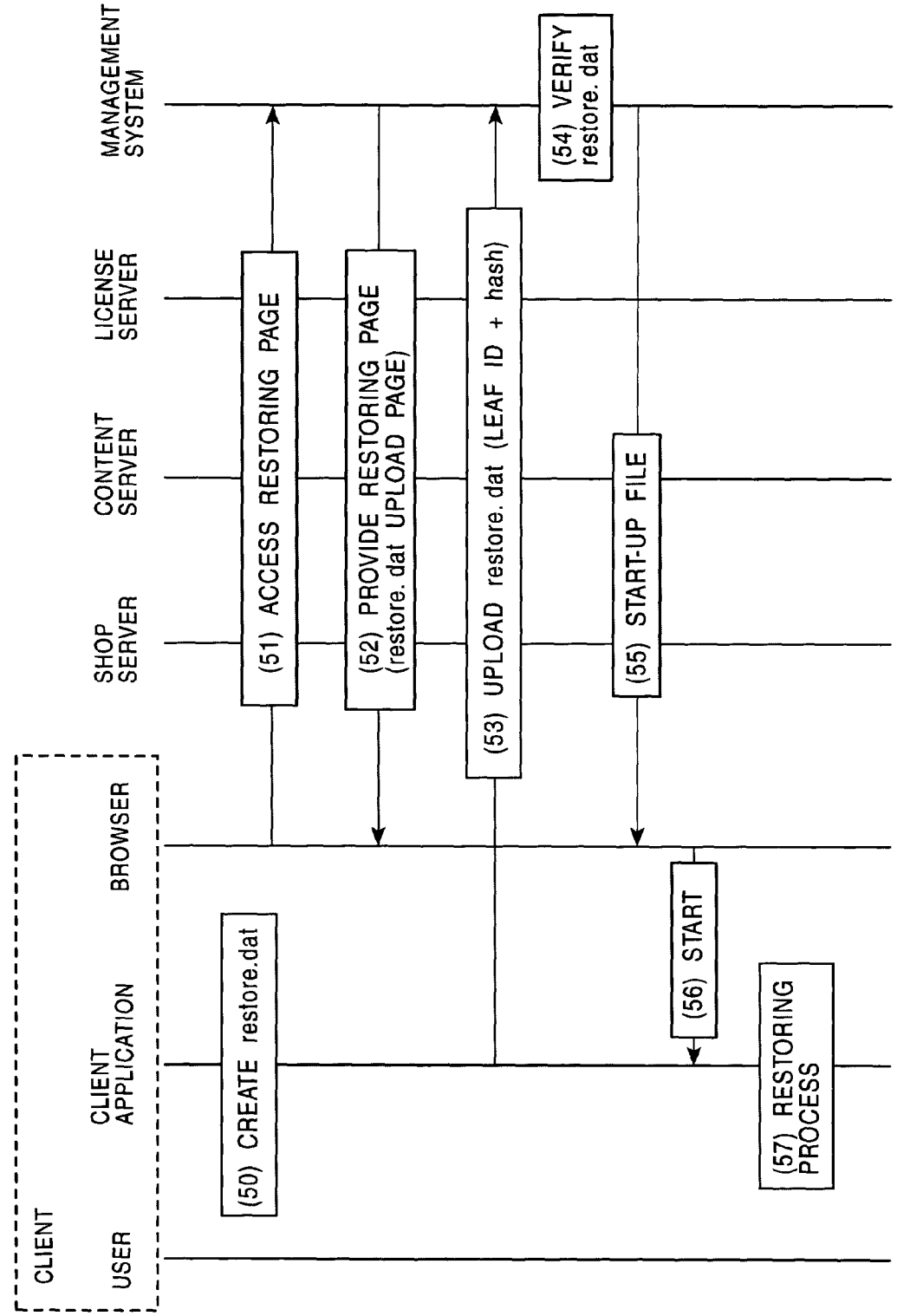
FIG. 23 is a sequence chart (#1) showing processes executed among entities in license or content backup/restoring processing.

FIG. 23 shows initial steps of a communication sequence in backup/restoring processing executed among a client such as a personal computer having a client application and a browser, a shop server, a content server, a license server, and a management system. The processes in the sequence chart in FIG. 23 are described below.

It is assumed that the client has purchased content in accordance with the above-described content purchasing processing. The sequence in FIG. 23 is executed, following the content purchase.

After executing the content purchasing processing, the client creates a restoring processing requesting file "restore.dat" as a data file for acquiring backup/restoring data (step (50)). The configuration of the restoring processing requesting file "restore.dat" is shown in FIG. 24.

Figure 24:
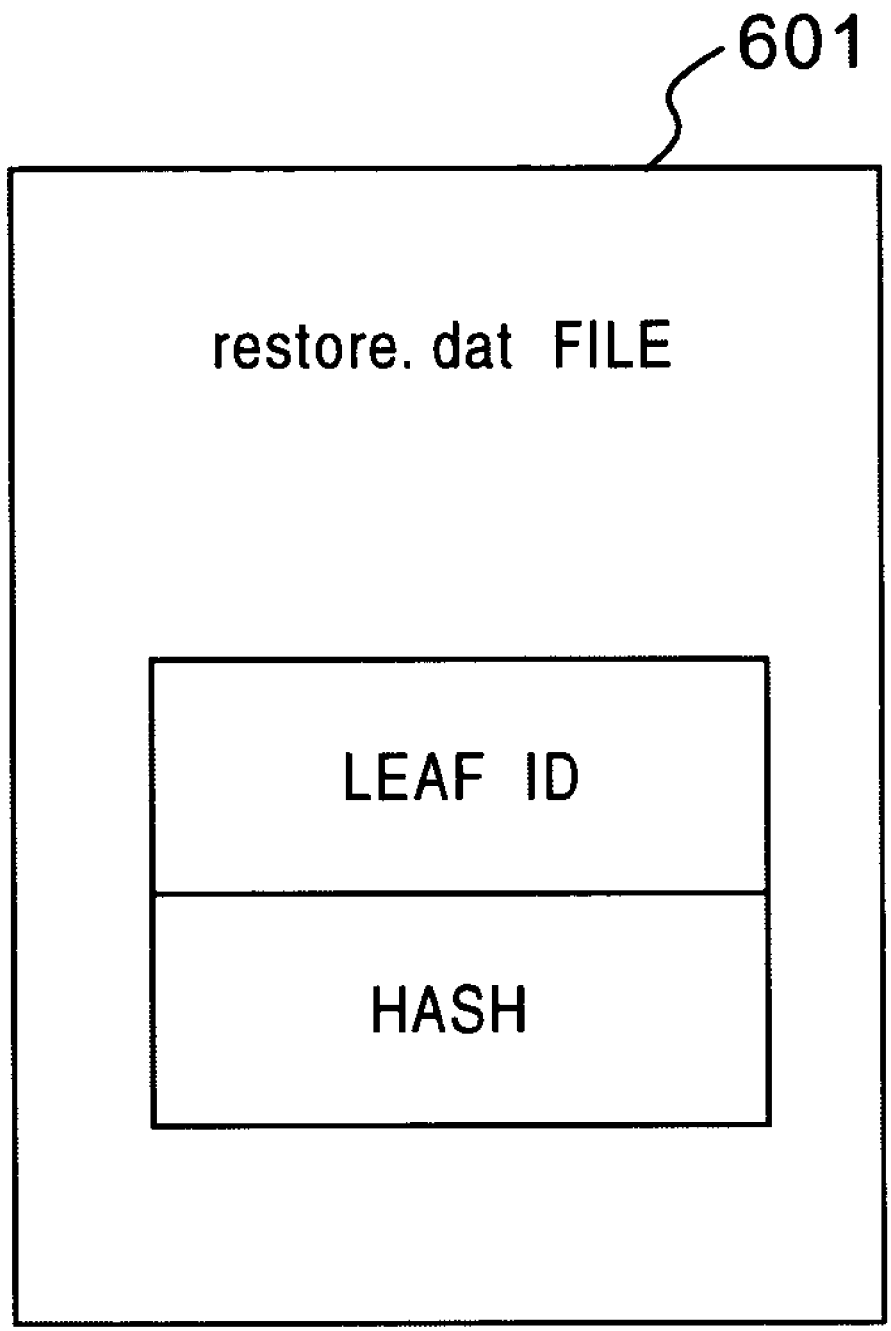
FIG. 24 is an illustration of a configuration of the restoring-processing requesting file "restore.dat"

As shown in FIG. 24, the restoring processing requesting file "restore.dat" contains verification data composed of a leaf ID as client identifying data in an enabling-key-block distributing tree, and a hash value, for example, a message authentication code (MAC). The client application calculates a hash value or MAC as verification data by using a secret key shared with the management system, and creates the restoring-processing requesting file "restore.dat" composed of a leaf ID and verification data.

Figure 25:
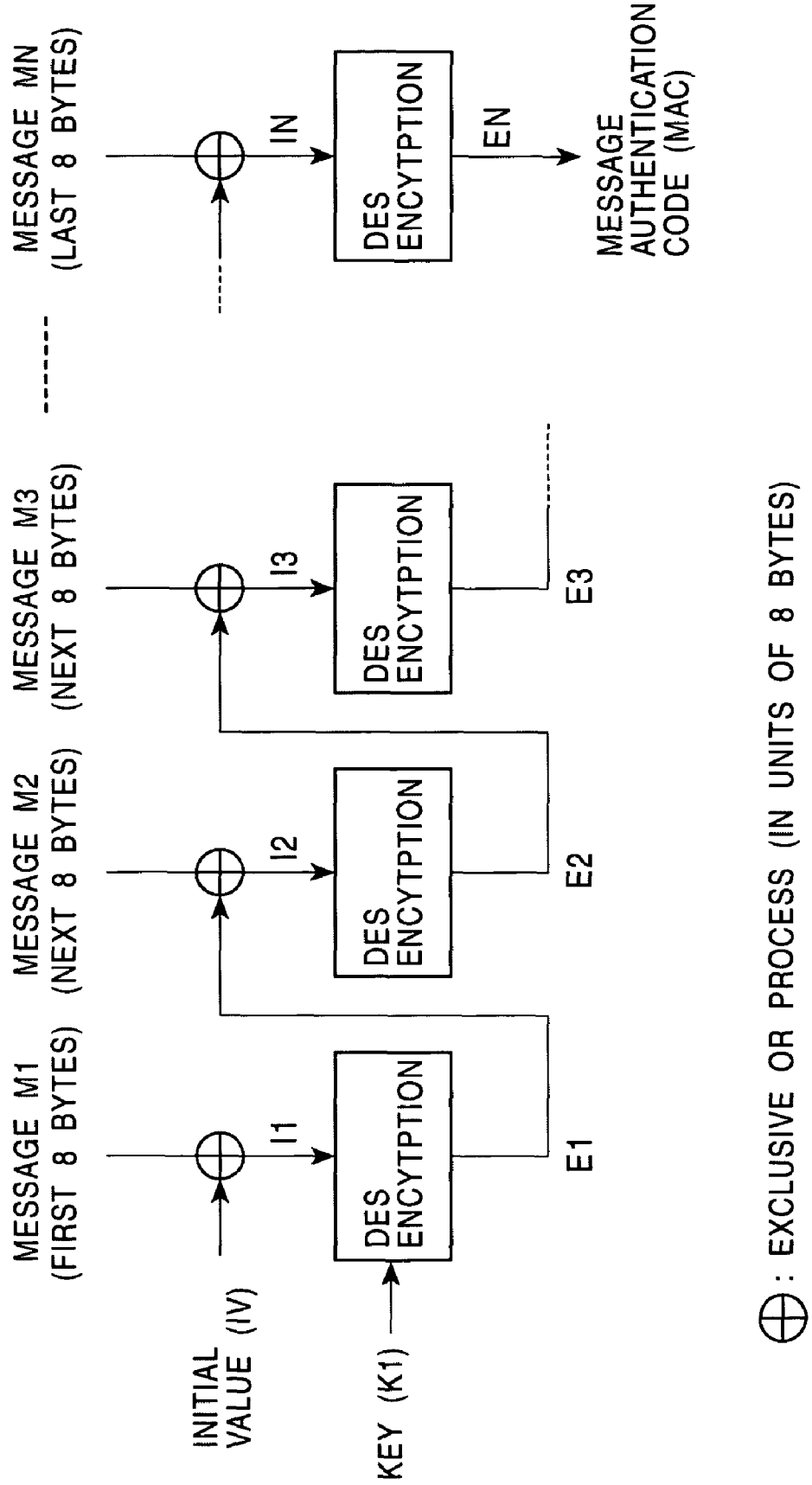
FIG. 25 is an illustration of processing of a message authentication code.

The message authentication code (MAC) is created as data falsification examining data. An example of generation of the MAC by using DES encryption is shown in FIG. 25. As FIG. 25 shows, a message to be processed is divided into units of 8 bytes (the divided messages are represented by M1, M2 ..., MN), and an initial value (hereinafter represented by IV) and M1 are exclusive ORed (the result is represented by I1). Next, I1 is input to a DES encrypting unit and is encrypted by using a key (represented by K1) (the output is represented by E1). E1 and M2 are exclusively ORed, and the output I2 is input and encrypted in a DES encrypting unit by using a key K1 (the output is represented by E2). Subsequently, by repeating these steps, encryption processing on all the messages is performed. The final output EN is a message authentication code (MAC).

The message authentication code has a different value when source data for generating the message authentication code is changed. A message authentication code generated based on data (message) to be verified is compared with a recorded message authentication code, and if both match, it is proved that the data (message) to be verified has not been changed or falsified.

Referring back to the sequence chart in FIG. 23, the description is continued. The client uses the browser to access a restoring page provided by the management system (step (51)). The management system displays the restoring page on the browser (step (52)). The restoring page has a function of executing uploading processing of the restoring-processing requesting file "restore.dat".

On the restoring page displayed by the management system, the client uploads the restoring-processing requesting file "restore.dat" created by the client application. As described with reference to FIG. 24, the restoring-processing requesting file "restore.dat" includes a leaf ID as client identifying data in the enabling key block tree and a hash value composed of, for example, a message authentication code.

After receiving the restoring-processing requesting file "restore.dat", the management system calculates a hash value for the leaf ID by using a secret key shared with the client. The management system examines the received data by performing comparing between the calculated hash value and the received hash value (step (54)). A backup/restoring start-up file is transmitted on condition that the calculated hash value and the received hash value match (step (55)). The configuration of the start-up file is identical to that already described with reference to FIG. 15.

The start-up file is transferred from the browser to the client application (step (56). The transferred start-up file starts a backup/restoring executing program which is identified and selected by a description or an extension of the start-up file, and restoring processing is executed (step (57)).

What is processed by backup/restoring processing includes service data, content, and a content usage right. As described above, the service data can be acquired by processing of registration to the license server, and content can be acquired from the content server. Also, the usage right information is acquired from the license server. Also in the backup/restoring processing, the above types of data are acquired from servers for the data.

Figure 26:
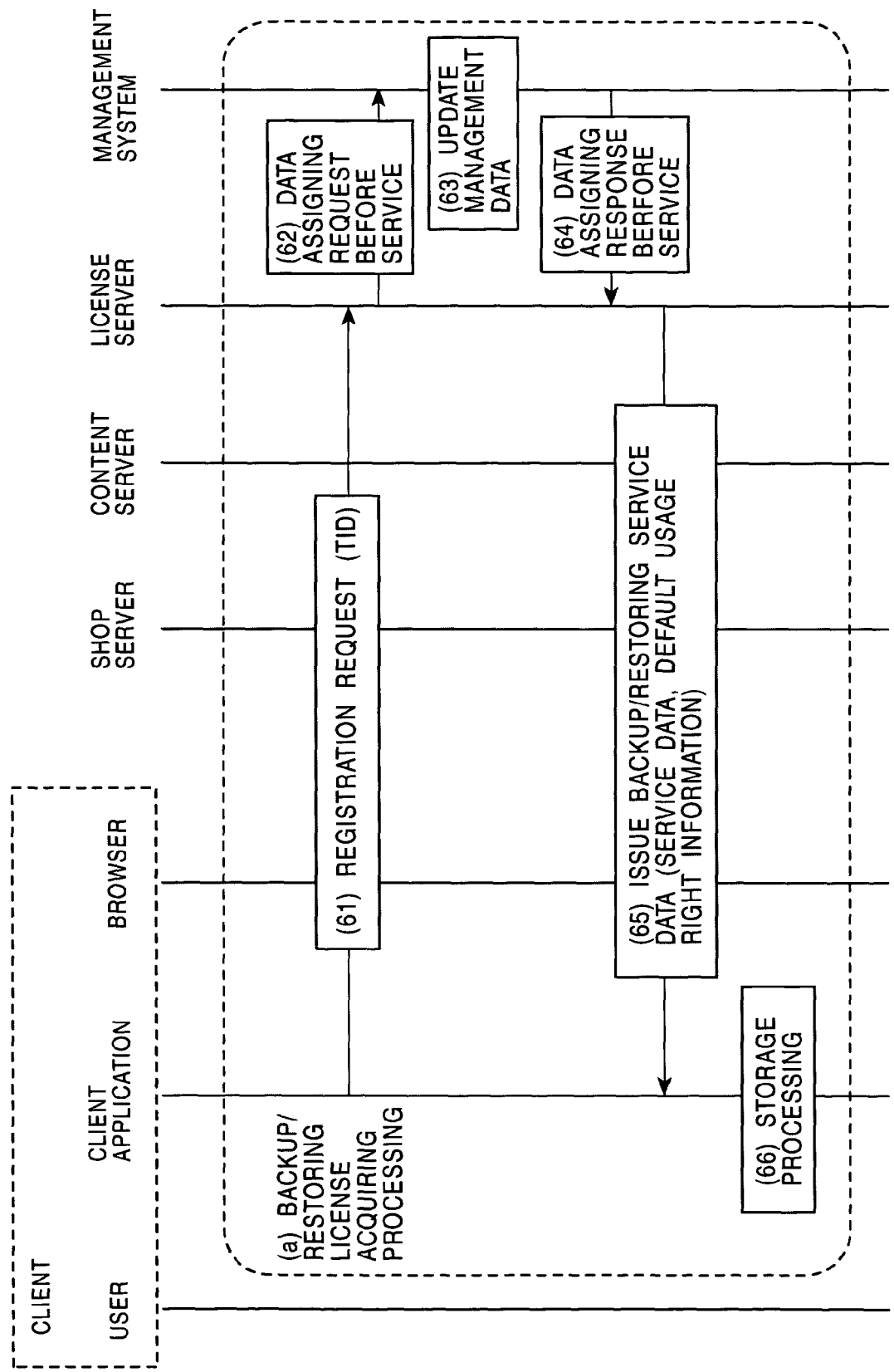
FIG. 26 is a sequence chart (#2) showing processes executed among entities in license or content backup/restoring processing.

Processing for acquiring backup/restoring service data is described below with reference to FIG. 26.

The processing basically complies with a procedure similar to that in the above-described client registering processing at content purchase.

The client application transmits a registering request to the license server (step (61)). The registering request includes a transaction ID (TID) included in the start-up file created by the management system.

After receiving the registering request, the license server recognizes, based on the transaction ID, that the request is for acquisition of backup/restoring service data, and sends, to the management system, a request to assign pre-service data, that is, backup/restoring data for service data (step (62)). Based on management data, the management system verifies whether there is a client terminal that executes processing based on an identical transaction ID. If there is the client terminal, the client terminal and the transaction ID are stored in a correlated form (step (63)). This is because the upper limit (e.g., three times) the backup/restoring processing is performed is set so that, in the case of a processing request exceeding the upper limit, the processing is not executed.

After executing updating processing on the management data, the management system transmits a response to preservice data assignment (step (64)). This is transmitted as issuance permitting information for backup/restoring service data.

After receiving the response to pre-service data assignment, the license server executes processing for issuing the backup/restoring service data to the client (step (65)). As already described with reference to portion (a) of FIG. 17, the service data includes a leaf ID unique to the client which is set in the enabling-key-block distributing tree, a service ID used as a service identifier, and data E(Kroot, DNK) obtained by using root key Kroot to encrypt the leaf ID unique to the client which is set in the enabling-key-block distributing tree, the service ID as a service identifier, and the device node key.

In addition, in this processing, the default usage right information (see portion (b) of FIG. 17) is also issued from the license server to the client. As described above, normally, the usage right information is issued in response to purchase of content after usage conditions of content to be purchased are stored. However, the default usage right information is not issued on condition that content is purchased, but is issued subject to client registering processing or service data issuing processing. The default usage right information is used as effective usage right information when audition processing of content is performed.

After receiving the service data and the default usage right information from the license server, the client backs up the data and information to a storage unit (step (66)).

Figure 27:
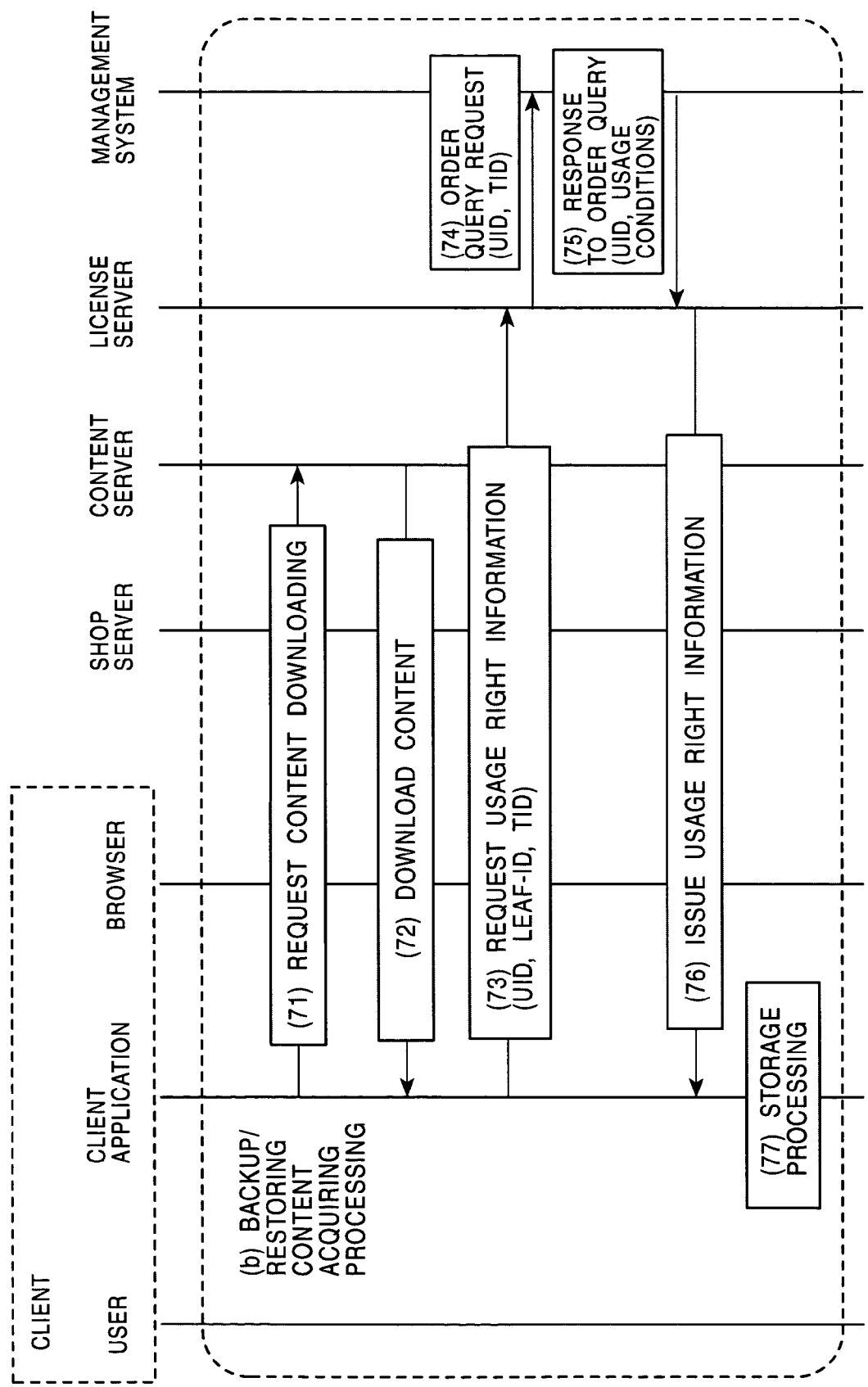
FIG. 27 is a sequence chart (#3) showing processes executed among entities in license or content backup/restoring processing.

Next, the content backup/restoring processing is described below with reference to FIG. 27.

In the case of executing the content backup/restoring processing, the client application sends, to the content server, a content downloading request (step (71)). The content is identical to that already purchased by the client. The client application uses a content ID to designate content and requests the content server to download the content.

After receiving the content downloading request, the content server transmits, to the client, content information corresponding to the content ID (step (72)). The content information includes encrypted content. As already described with reference to portion (c) of FIG. 17, the content information includes content data Enc(Kc, Content) obtained by encryption using content key Kc, Enc(Kroot, Kc) obtained by using root key Kroot to encrypt content key Kc, data Enc(Kroot, Kc) obtained by using root key Kroot to encrypt content key Kc, an enabling key block for acquiring root key Kroot, and information such as audition flag data and a service ID.

After receiving the content information, the client transmits, to the license server, a request to acquire usage right information corresponding to the received content (step (73)). This request includes usage right information included in the start-up file (see FIG. 15), a leaf ID used as client identifying data, and a transaction ID.

After receiving the request to acquire the usage right information, the license server sends a request to query the management system about an order (step (74)). This request includes the usage right information and the transaction ID. After receiving the order query, the management system transmits, to the license server, response information in which usage conditions are set correspondingly to the usage right information ID, as a response to the order query (step (75))

After receiving the response information, the license server creates usage right information in which content usage conditions are set, and re-issues the information to the client (step (76)). The content usage conditions contain the number of times content is played back, a time limit, and information for permitting various processes such as copying and check-out to an external unit.

After receiving the usage right information, the client stores the already received content and usage right information as backup data in the storage unit.

In the backup/restoring processing, the usage right information issued by the license server may be formed so that usage conditions, different from usage right information issued in normal content purchasing processing, are set. For example, backup/restoring processing usage information may be set and issued which includes conditions severe than those included in usage right information issued at normal purchase of content, for example, a limitation of the period of use, prohibition of copying, or prohibition of check-out.

8. Secondary Distribution of Content by Using Recommendation File

Next, a system is described below which enables the use of content on condition that a client which is authorized to purchase content executes so-called "secondary distribution of content" that provides another client with the purchased content, and a new content usage right is distributed from the license server, whereby the client which receives the secondary distributed content possesses the valid content usage right, and which reduces the content distributing load of the content server.

As described above, in order to use content, the client which plays back the content must receive encrypted content from the content server and must receive license information, that is, service data, and usage right information for the content from the license server.

The license information, that is, the service data and the usage right information, have a small volume of data. Thus, if the license information is frequently transmitted and received by using a communication network such as the Internet, the network traffic does not increase, so that a problem of a large distribution time does not occur. Conversely, the content has a large volume of data since it includes music data, picture data, and programs. When the content having the large volume of data is transmitted from a particular content server to many clients, the transmission time is increased, thus causing various problems such as a load on the content server and an increase in the network traffic. A problem of a content distribution error caused by a communication error during communication may occur.

A system is described below in which provision of content purchased in an authorized form by a client to another client, that is, secondary distribution, is executed, and the client provided with the content in the secondary distribution receives license information for the content, whereby the load of the content server for transmitting the content to the client is reduced.

Figure 28:
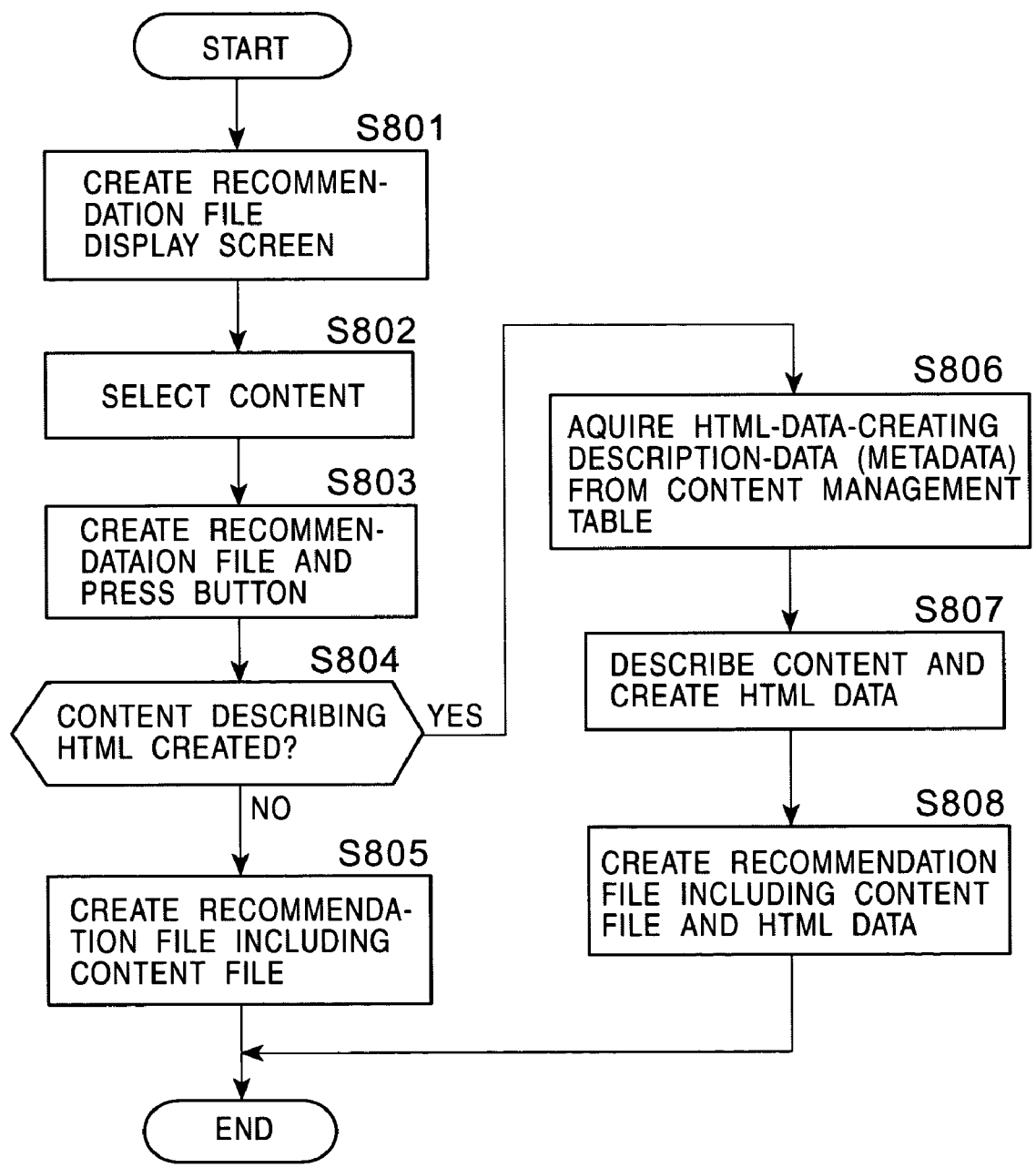
FIG. 28 is a flowchart showing creation of a recommendation file.

FIG. 28 is a flowchart illustrating a process in which a client authorized to received content creates a content file to be provided to another client. A data file including content to be provided to the other client is called a "recommendation file". The recommendation file includes a content file including encrypted content, and a description file (e.g., an HTML file) for the content, as required.

The flowchart in FIG. 28 is described below.

A client which executes the process in FIG. 28 has purchased content in an authorized form by executing the above-described content purchasing processing, or has received the recommendation file from another client and has obtained a proper license in the subsequent procedure. The process in FIG. 28 is executed as one execution program under the control of a control unit (e.g., a CPU) of an information processing apparatus as a client system. In step S801, the client displays a recommendation file creating screen on its display.

Figure 29:
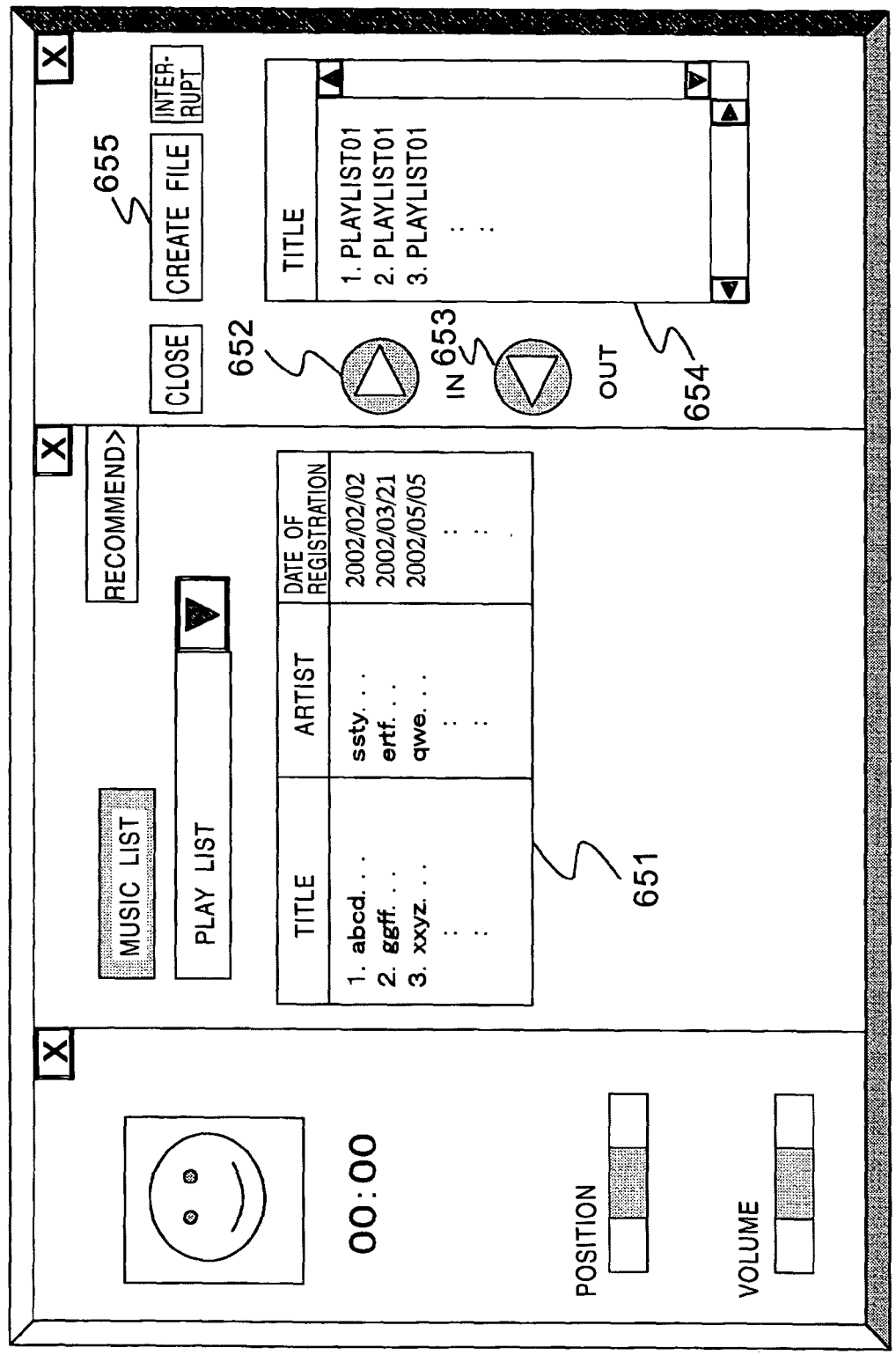
FIG. 29 is an illustration of a recommendation file creating screen.

An example of the recommendation file creating screen is shown in FIG. 29. A content list 651 of pieces of content that have been purchased by an authorized client and can be played back is displayed in the center. When the recommendation file is created, by selecting (in step S802) a piece of content selected from the content list 651, a title, etc., are displayed on the right list 654.

Movement of content between the content list 651 and the list 654 is executed by operating movement switches 652 and 653. After pieces of content to be used for creating the recommendation file are selected, in step S803, a recommendation file creating button 655 is pressed. Pressing the recommendation file creating button 655 determines, in step S804, whether a description file matching the content file, for example, a description file described in, for example, HTML, is created and stored in the recommendation file. This can be freely determined by a user.

Figure 30A:
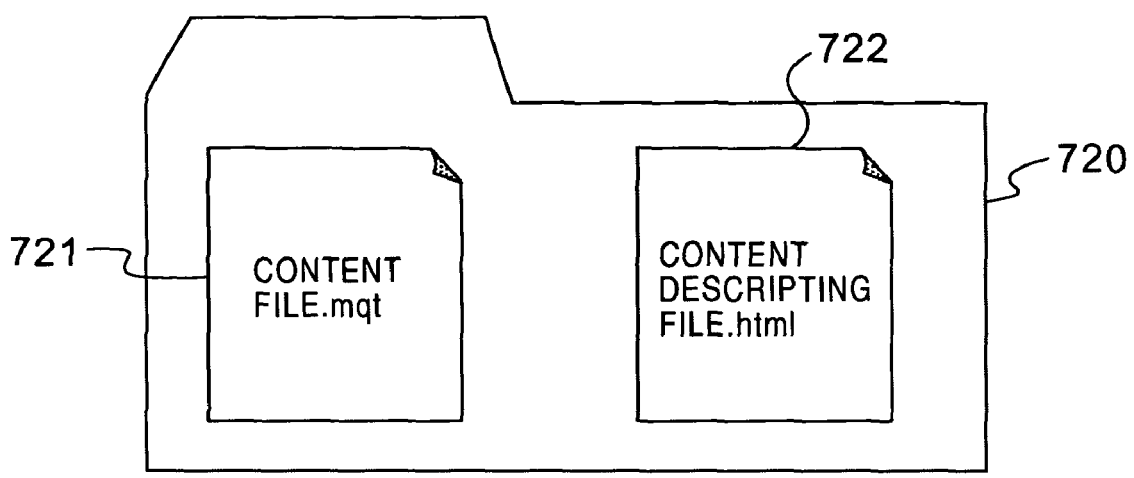
FIGS. 30A and 30B are illustrations of recommendation file structures.
Figure 30B:
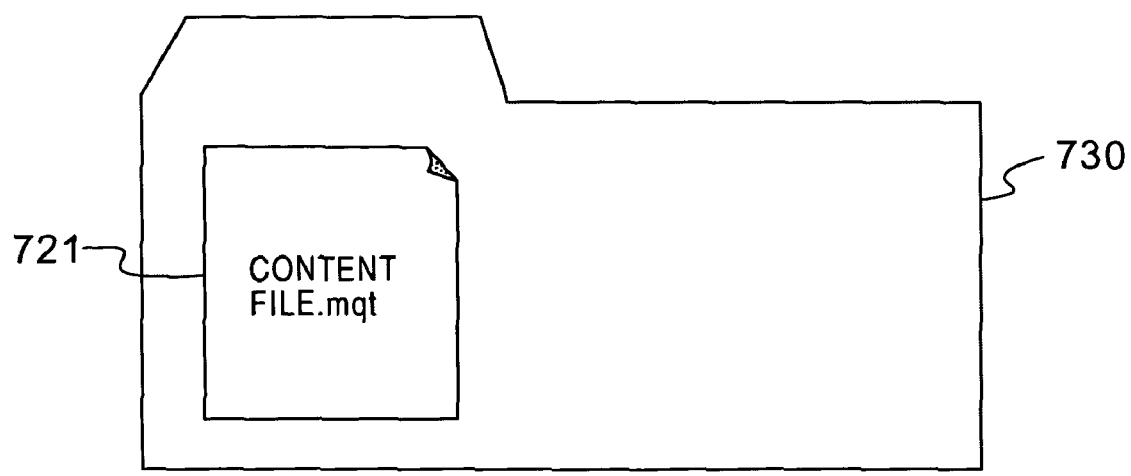

The recommendation file is divided into two structures: the structure of the recommendation file 720 shown in FIG. 30A which is formed by combining a content file 721 including encrypted content and a content description file 722; and the structure of the recommendation file 730 shown in FIG. 30B which is formed by only a content file 721. The client can freely select one of the two structures.

In step S804, if it has been determined that the content description file is not created, the recommendation file structure 730 (FIG. 30B) formed by only the content file 721 is created.

Figure 31:
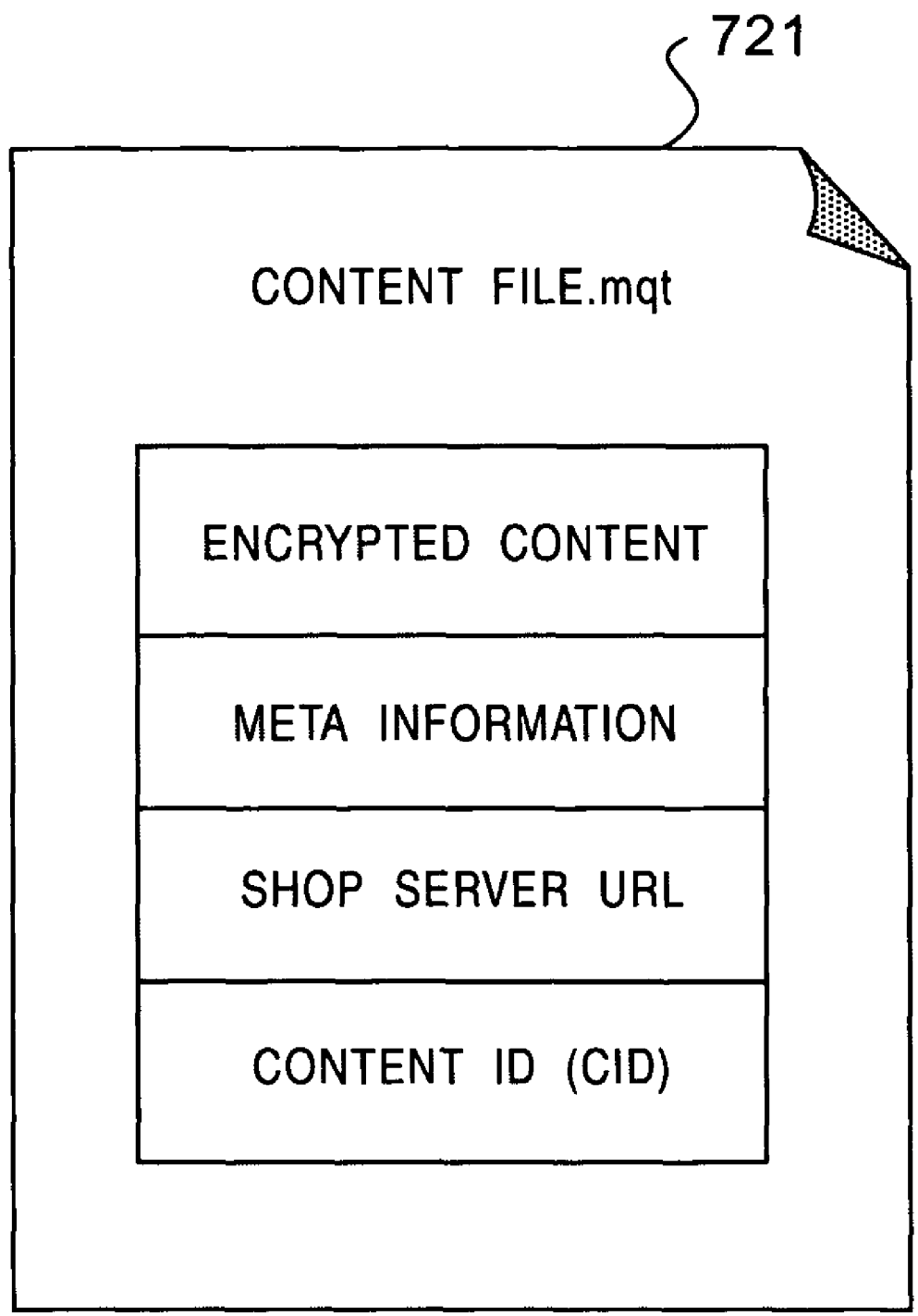
FIG. 31 is an illustration of a configuration of a content file included in a recommendation file.

The configuration of the content file 721 is shown in FIG. 31. The content file 721 (MQT file) includes encrypted content, meta information as additional information for content, a shop server URL representing a shop at which content can be purchased, and a content ID as a content identifier.

The encrypted content included in the content file 721 has a form encrypted by using content key Kc. Content key Kc can be acquired by an application of a key that can be acquired by decrypting an enabling key block provided by using the enabling-key-block-distribution tree configuration.

In step S804, if it has been determined that the content description file is created, the process proceeds to step S806, description data (meta data) for creating the content description file (HTML file) is acquired from the content management table. Content describing data for the content is stored also in the content file, with the encrypted content, as described above. The client authorized to acquire a content usage right stores and manages, in a separate file, the meta data (for content) extracted from the content file. Accordingly, the meta data for the content description file created in the recommendation file is extracted from the content management data.

In step S807, the meta data extracted from the content management data is added to a template HTML file set in the client application, whereby a describing HTML file for content is created. In step S808, the recommendation file, which consists of the content file and the describing HTML file, is created.

Figure 32:
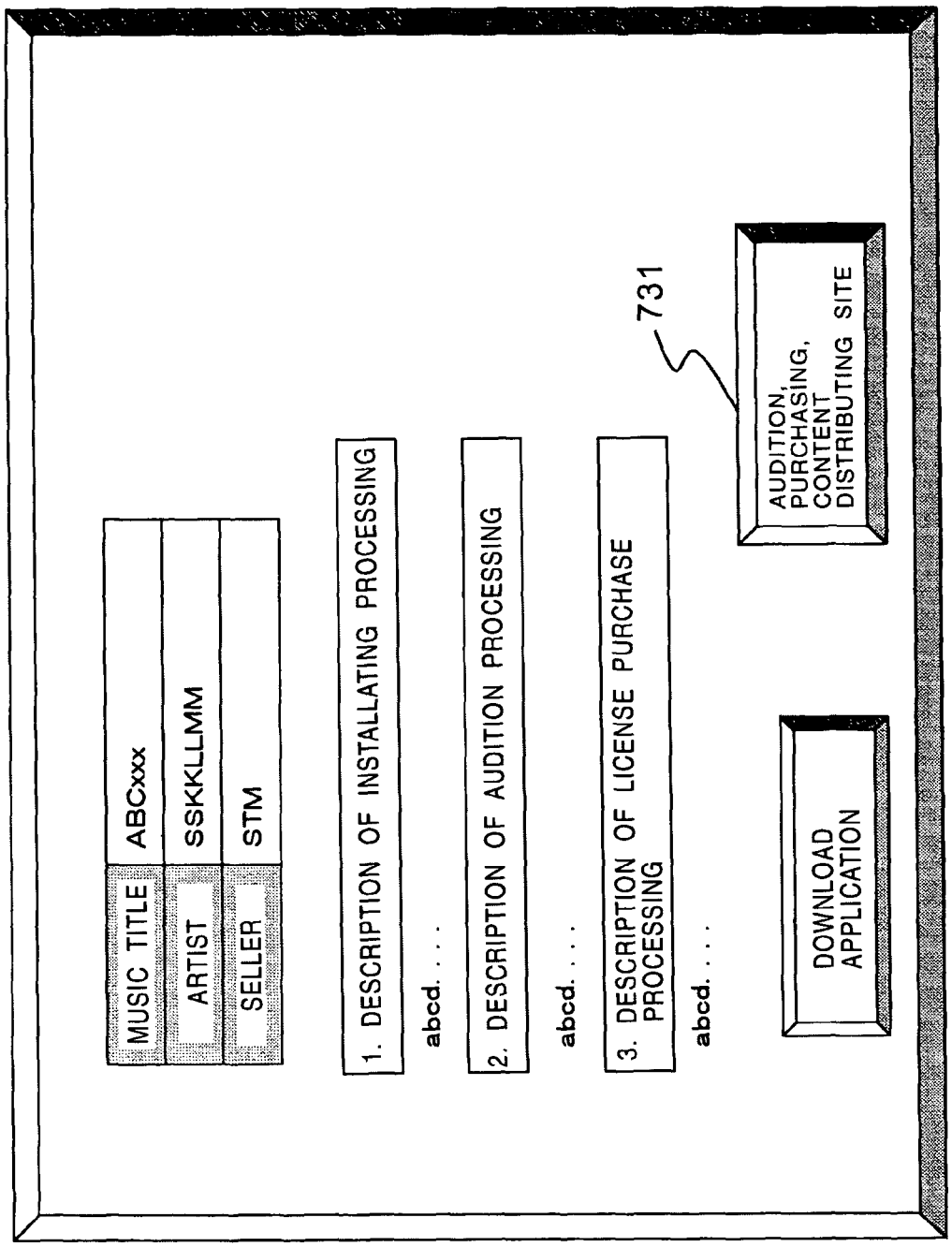
FIG. 32 is an illustration of an example of a displayed screen of an HTML file used as content describing data.

FIG. 32 shows an example of a displayed screen of an HTML file used as content describing data. In the example in FIG. 32, content is music data. The description file includes descriptions of an information list including the music title of music content, an artist, and a seller, various operations, and processes. A client which receives the recommendation file from another client opens the description file at first.

Since the content stored in the recommendation file has an encrypted form, it cannot be played back when valid license information, that is, service data and usage right information for the content are not acquired. Accordingly, when the client which receives the recommendation file uses the content stored in the recommendation file, it executes a procedure for acquiring the license information.

Figure 33:
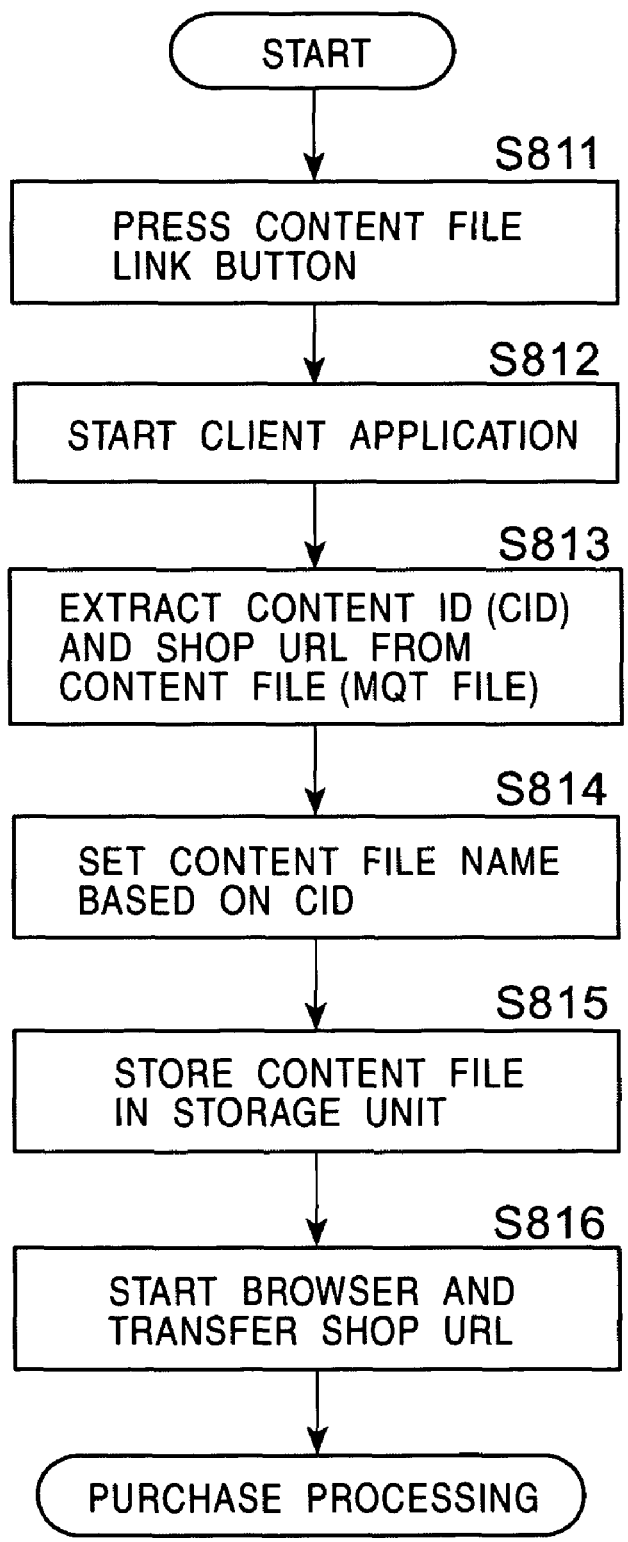
FIG. 33 is a flowchart (#1) showing a license information acquiring process in a client after it receives a recommendation file.

A process for acquiring the license information is described below with reference to FIGS. 33 and 34.

The client which receives the recommendation file opens the description file (HTML file) shown in FIG. 32, and clicks on the button 731 in FIG. 32, which is indicated by "AUDITION, PURCHASING, CONTENT DISTRIBUTING SITE" (step S811). The clicking-on starts the client application (step S812). A content file (MQT file) (see FIG. 31) included in the same recommendation file is read, and a content ID and a shop URL are extracted from the content file (step S813).

As described above, the button 731 (indicated by "AUDITION, PURCHASING, CONTENT DISTRIBUTING SITE") is provided as link data for starting the client application that extracts the shop server URL from the content file, and outputs the extracted URL to a browser. Therefore, a client having received the recommendation file can execute purchasing processing by easily connecting to the shop.

In step S814, based on the content ID extracted from the content file, a content file name is set. This is executed as a file name setting process preset in the client application. For example, the title of content, an artist name, or composite data therefrom or the like is used. In step S815, the content file corresponding to the file name set in step S814 is stored in the storage unit of the client.

In step S816, the shop URL extracted from the content file in step S813 is transferred to the browser, and the browser reads, from the shop server, a shop page corresponding to the received URL.

Figure 34:
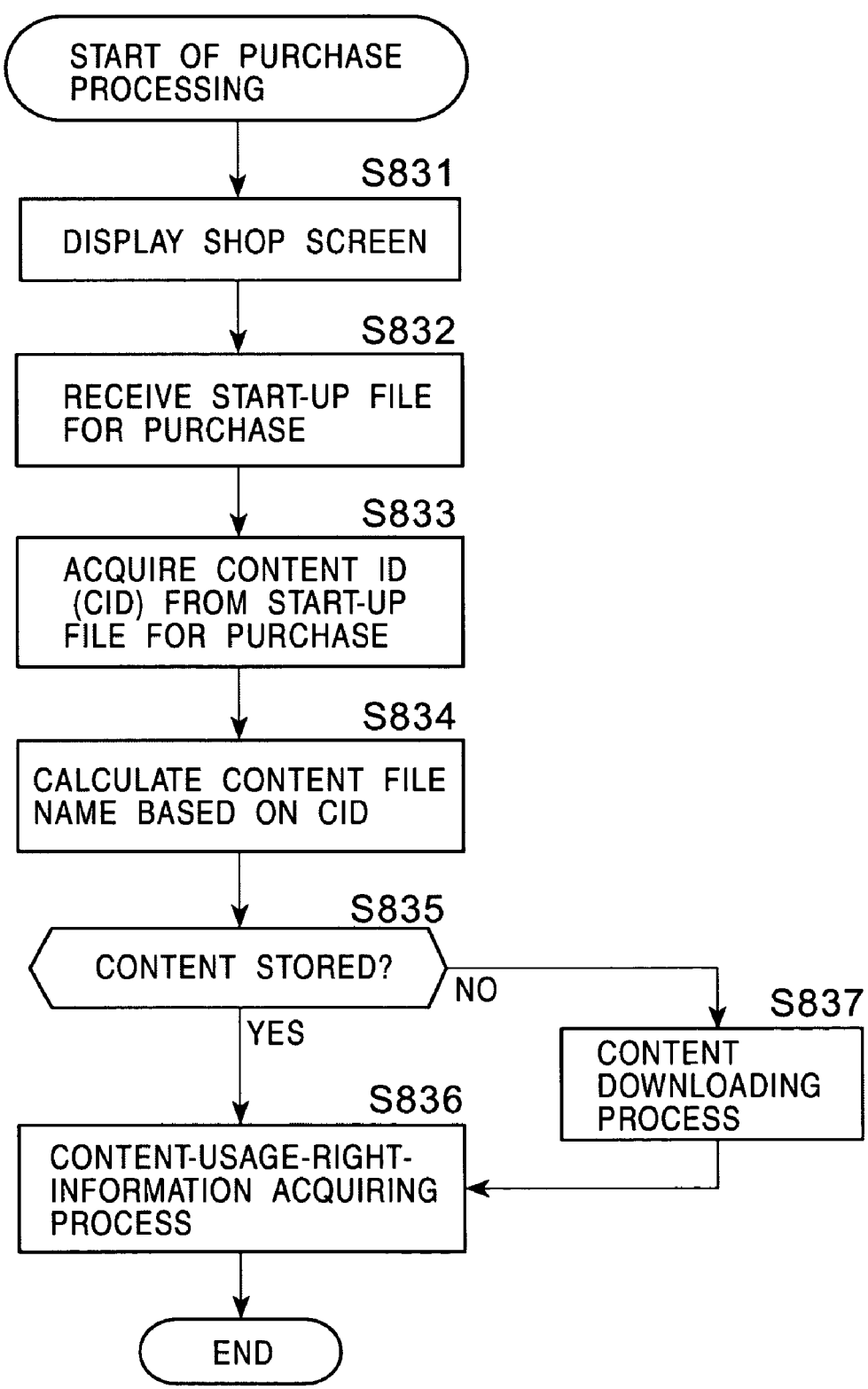
FIG. 34 is a flowchart (#2) showing a license information acquiring process in a client after it receives a recommendation file.

In step S831 in the flowchart shown in FIG. 34, a shop screen is displayed on the display of the client. The following processing is basically similar to one of the above-described content purchasing processing and audition processing, and complies with the processing described with reference to FIGS. 11, 13, 18, and 21. However, the content itself has already been acquired from the recommendation file, and processing for receiving content from the content server is omitted.

An outline of the consecutive processing is represented by step S832 in the flowchart in FIG. 34 and the subsequent steps. After the client outputs a purchasing request to the shop server by designating purchase on the shop screen displayed by the shop server, a start-up file for purchase is transmitted from the shop server. This start-up file is similar in configuration to that described with reference to FIG. 15.

In step S833, a content ID as a content identifier is acquired from the start-up file. In step S834, based on the content ID, a content file name is generated. In the client application, it is determined that the content file name in the case of storing content in the client apparatus is set based on the content ID, as mentioned in the description of the flowchart in FIG. 33. The correspondence between the content ID and the file name is established.

In step S835, it is determined whether the storage unit of the client stores a content file having a file name identical to that generated based on the content ID. If no content file is stored, the process proceeds to step S837, and connection to the content server is established and the content is downloaded. This process is similar to the above-described process performed in the case of purchasing content.

However, since the client having received the recommendation file stores, in steps S814 and S815, the content file having a predetermined file name, a content downloading process is omitted and the purchasing process can be terminated by executing a content-usage-right-information acquiring process.

When the client plays back content, it compares the content ID included in the content usage right information with the content ID of content to be played back, and executes content playback on condition that both content IDs match each other, as described above. Also, by acquiring content key Kc by decrypting an enabling key block provided by an application of the enabling key block distribution tree, and executing encrypted content by using the acquired content key Kc, the content can be played back.

As described above, a client having already possessed content provides another client with a content file including encrypted content and a recommendation file formed by a description file, whereby the other client can receive the content without accessing a content distributing server. The other client can use the content subject to acquiring usage right information. Thus, unauthorized use of the content is prevented.

Although, in the flowchart in FIG. 34, a service data acquiring process is omitted, when a client which possesses no service data receives the recommendation file, the service data must be acquired by performing the registering process by accessing the license server. The registering process corresponds to the processing described with reference to FIGS. 13 and 16.

The present invention has been described with reference to specific embodiments. However, it is obvious for a person skilled in the art to modify or substitute the embodiments without departing from the gist of the present invention. In other words, the present invention has been disclosed in a form of exemplification, and should not be interpreted in limited sense. To determine the gist of the present invention, the appended claims should be considered.

The consecutive processing described in the specification can be executed by hardware, software, or a composite system of both. In the case of executing processing by software, the processing can be executed by installing, in a memory of a built-in computer of dedicated hardware, a program describing a processing sequence, or can be executed by installing a program in a multi-purpose computer that can execute various processes.

For example, the program can be recorded beforehand on a hard disk or a ROM as a recording medium. Alternatively, the program can be temporally or eternally stored (recorded) on a removable recording medium such as a flexible disk, a CD-ROM, a magneto-optical disk, a DVD, a magnetic disk, or a semiconductor memory. This type of removable recording medium can be provided in the form of package software.

The program can be, not only installed from the above removable recording medium to computer, but also transferred by radio to the computer. In addition, the program can be transferred to the computer by a network such as the Internet. The computer receives the transferred program and installs the received program in a built-in storage medium such as a hard disk.

Various processes described in the specification are not only executed in a time series in accordance with the order given, but also executed in parallel or separately in accordance with the processing ability of an apparatus that executes the processes or as required.

What is claimed is:

1. An information processing apparatus of a client for receiving a usage right corresponding to an encrypted content, the information processing apparatus comprising:

means for generating, after the client purchases the content, a restoration request file and storing the restoration request file on the information processing apparatus of the client;

means for storing usage right identifying information, the usage right identifying information identifying the usage right corresponding to the content, the usage right being initially issued to the information processing apparatus by a license server;

means for transmitting a restoring request to restore the usage right identifying information using backup data, the restoring request including client identifying information for identifying the information processing apparatus, and data for verifying the restoring request, the data for verifying the restoring request including a hash value calculated based on a first encryption key specific to the information processing apparatus, wherein transmitting the restoring request includes uploading the restoration request file;

means for receiving a response to the restoring request including reissued usage-right identifying information corresponding to the usage right;

means for transmitting, to the license server, a usage-right request including the reissued usage-right identifying information; and means for receiving the usage right corresponding to the content from the license server.

2. An information processing apparatus according to claim 1, wherein:

the response to the restoring request includes content identifying information for identifying the content corresponding to the usage right; and the information processing apparatus further comprises:
means for transmitting, to a content server, a content request based on the content identifying information; and
means for receiving the content, the content being transmitted from the content server in response to the content request.

3. An information processing apparatus according to claim 1, wherein the usage right includes the client identifying information and a signature, and the client identifying information identifies the information processing apparatus or a user of the information processing apparatus permitted to use the content corresponding to the usage right.

4. An information processing apparatus according to claim 1, wherein:

the response to the restoring request includes a transaction ID for identifying a restoring transaction;

the information processing apparatus further comprises:
means for transmitting, to said license server, a registering request including the transaction ID; and
means for receiving registering information including a second encryption key required for decrypting the content, the registering information being transmitted from said license server in response to the registering request; and
wherein the usage-right request includes the transaction ID.

5. A license server for transmitting a usage right to a client, the license server comprising:

means for storing usage-right identifying information corresponding to the usage right, the usage-right identifying information having been initially issued to the client;

means for receiving a restoring request including client identifying information for identifying the client and data for verifying the restoring request, the data for verifying the restoring request including a hash value calculated based on a first encryption key specific to the client, wherein the restoring request includes an uploaded restoration request file stored on the client and generated after the client purchased the content;

means for reissuing the usage right identifying information if the restoring request is valid, by transmitting the usage-right identifying information as a response to the restoring request;

means for receiving a usage-right request including the reissued usage-right identifying information; and means for transmitting the usage right in response to the usage-right request.

6. A license server according to claim 5, wherein the usage right includes the client identifying information and a signature, and the client identifying information identifies an information processing apparatus or a user of the information processing apparatus, and the information processing apparatus or the user is permitted to use the content corresponding to the usage right.

7. A license server according to claim 5, wherein:

the response to the restoring request includes a transaction ID for identifying a restoring transaction;

the license server further comprises:
means for receiving a registering request including the transaction ID; and
means for transmitting, in response to the registering request, registering information including a second encryption key required for decrypting the content; and the usage-right request includes the transaction ID.

8. An information processing method for receiving a usage right corresponding to an encrypted content, the information processing method comprising the steps of:

generating, after a client purchases the content, a restoration request file;

storing the restoration request file on an information processing apparatus of the client;

storing usage right identifying information, the usage right identifying information identifying a usage right corresponding to the content, the usage right being initially issued to the information processing apparatus by a license server;

transmitting a restoring request to restore the usage right identifying information using backup data, the restoring request including client identifying information for identifying the information processing apparatus, and data for verifying the restoring request, the data for verifying the restoring request including a hash value calculated based on a first encryption key specific to the information processing apparatus, wherein transmitting the restoring request includes uploading the restoration request file;

receiving a response to the restoring request including reissued usage-right identifying information corresponding to the usage right;

transmitting, to the license server, a usage-right request including the reissued usage-right identifying information; and receiving the usage right corresponding to the content from the license server.

9. An information processing method according to claim 8, wherein:

the response to the restoring request includes content identifying information for identifying the content corresponding to the usage right; and the information processing method further comprises the steps of:
  transmitting, to a content server, a content request based on the content identifying information; and
  receiving the content, the content being transmitted from the content server in response to the content request.

10. An information processing method according to claim 8, wherein the usage right includes the client identifying information and a signature, and the client identifying information identifies the information processing apparatus or a user, of the information processing apparatus permitted to use the content corresponding to the usage right.

11. An information processing method according to claim 8, wherein:
  the response to the restoring request includes a transaction ID for identifying a restoring transaction;
  the information processing method further comprises the steps of:
    transmitting, to said license server, a registering request including the transaction ID; and
    receiving registering information including a second encryption key required for decrypting the content, the registering information being transmitted from said license server in response to the registering request; and
  wherein the usage-right request includes the transaction ID.

12. A method for controlling a license server for transmitting a usage right to a client, the method comprising the steps of:
  storing usage-right identifying information corresponding to the usage right, the usage-right identifying information having been initially issued to the client;
  receiving a restoring request to restore information using backup data, the restoring request including client identifying information for identifying the client and data for verifying the restoring request, the data for verifying the restoring request including a hash value calculated based on a first encryption key specific to the client, wherein the restoring request includes an uploaded restoration request file stored on the client and generated after the client purchased the content;
  reissuing the usage right identifying information if the restoring request is valid by transmitting the usage-right identifying information as a response to the restoring request;
  receiving a usage-right request including the reissued usage-right identifying information; and
  transmitting the usage right in response to the usage-right request.

13. A method according to claim 12, wherein the usage right includes the client identifying information and a signature, and the client identifying information identifies the information processing apparatus or the user of the information processing apparatus, and the information processing apparatus or the user is permitted to use the content corresponding to the usage right.

14. A method according to claim 12, wherein:
  the response to the restoring request includes a transaction ID for identifying a restoring transaction;
  the method further comprises the steps of:
    receiving a registering request including the transaction ID; and
    transmitting, in response to the registering request, registering information including a second encryption key required for decrypting the content; and
  the usage-right request includes the transaction ID.

15. A computer-readable storage medium storing a program for performing a method for receiving a usage right corresponding to encrypted content corresponding to a usage right, the method comprising the steps of:
  generating, after a client purchases the content, a restoration request file and storing the restoration request file on an information processing apparatus of the client;
  storing usage right identifying information, the usage right identifying information identifying a usage right corresponding to the content, the usage right being initially issued to the information processing apparatus by a license server;
  transmitting a restoring request to restore the usage right identifying information using backup data, the restoring request including client identifying information for identifying the information processing apparatus, and data for verifying the restoring request, the data for verifying the restoring request including a hash value calculated based on a first encryption key specific to the information processing apparatus, wherein transmitting the restoring request includes uploading the restoration request file;
  receiving a response to the restoring request including reissued usage-right identifying information corresponding to the usage right;
  transmitting, to the license server, a usage-right request including the reissued usage-right identifying information; and
  receiving the usage right corresponding to the content from the license server.

16. A computer-readable storage medium according to claim 15, wherein:
  the response to the restoring request includes content identifying information for identifying the content corresponding to the usage right; and
  the program further comprises the steps of:
    transmitting, to a content server, a content request based on the content identifying information; and
    receiving the content, the content being transmitted from the content server in response to the content request.

17. A computer-readable storage medium according to claim 15, wherein the usage right includes the client identifying information and a signature, and the client identifying information identifies the information processing apparatus or the user of the information processing apparatus permitted to use the content corresponding to the usage right.

18. A computer-readable storage medium according to claim 15, wherein:
  the response to the restoring request includes a transaction ID for identifying a restoring transaction;
  the method further comprises the steps of:
    transmitting, to said license server, a registering request including the transaction ID; and
    receiving registering information including a second encryption key required for decrypting the content, the registering information being transmitted from the license server in response to the registering request; and
  wherein the usage-right request includes the transaction ID.

19. A computer-readable storage medium storing a program for performing a method for transmitting, to a client, a usage right to permit the use of content, the method comprising the steps of:
  storing usage-right identifying information corresponding to the usage right, the usage-right identifying information having been initially issued to the client;

receiving a restoring request to restore information using backup data, the restoring request including client identifying information for identifying the client and data for verifying the restoring request, the data for verifying the restoring request including a hash value calculated based on a first encryption key specific to the client, wherein the restoring request includes an uploaded restoration request file stored on the client and generated after the client purchased the content;

reissuing the usage right identifying information if the restoring request is valid, by transmitting the usage-right identifying information as a response to the restoring request;

receiving a usage-right request including the reissued usage-right identifying information; and transmitting the usage right in response to the usage-right request.

20. A computer-readable storage medium according to claim 19, wherein the usage right includes the client identifying information and a signature, and the client identifying information identifies an information processing apparatus or a user of the information processing apparatus, and the information processing apparatus or the user is permitted to use the content corresponding to the usage right.

21. A computer-readable storage medium according to claim 19, wherein:

the response to the restoring request includes a transaction ID for identifying a restoring transaction;

the method further comprises the steps of:

receiving a registering request including the transaction ID; and transmitting, in response to the registering request, registering information including a second encryption key required for decrypting the content; and the usage-right request includes the transaction ID.

* * * * *